United States Patent [19]
Watanabe

[11] Patent Number: 6,091,551
[45] Date of Patent: Jul. 18, 2000

[54] INFRARED ZOOM LENS SYSTEM

[75] Inventor: Fumio Watanabe, Saitama, Japan

[73] Assignee: Fuji Photo Optical Co., Ltd., Saitama, Japan

[21] Appl. No.: 09/013,600

[22] Filed: Jan. 26, 1998

[30] Foreign Application Priority Data

Jan. 30, 1997 [JP] Japan ................................. 9-033086

[51] Int. Cl.$^7$ .............................. G02B 15/14; G02B 13/14
[52] U.S. Cl. .......................... 359/676; 359/357; 359/354
[58] Field of Search ..................... 359/676, 683, 359/356, 357, 354; 250/330

[56] References Cited

U.S. PATENT DOCUMENTS

| | | | |
|---|---|---|---|
| 3,273,457 | 9/1966 | Macher et al. | 359/683 |
| 4,632,498 | 12/1986 | Neil | 359/683 |
| 4,659,171 | 4/1987 | Neil | 359/354 |

*Primary Examiner*—Georgia Epps
*Assistant Examiner*—Jordan M. Schwartz
*Attorney, Agent, or Firm*—Young & Thompson

[57] ABSTRACT

An infrared zoom lens comprises, in order from the subject end to the image end, a positive power first lens group having lens elements less than three, a negative power second lens group having lens elements less than three, a third lens group having a single meniscus lens element with a concave subject side surface, a fourth lens group having a single convex lens element, and a positive power fifth lens group having at least four lens elements which include a convex meniscus lens with a concave image side surface facing directly to an image plane, the second and third lens groups being axially movable in predetermined relation relative to each other and relative to the first, fourth and fifth lens groups which are stationary to vary the zoom ratio of the infrared zoom lens and form a sharp image on the image plane, and satisfies the following conditions:

$$1.00 < f_1/f_t$$
$$-0.40 > f_2/f_t$$
$$0.35 < f_5/f_t < 0.70$$

where $f_t$ is the overall focal length of the infrared zoom lens in the tele-photo end position, and $f_1$, $f_2$ and $f_5$ are the focal lengths of the first, second and fifth lens groups, respectively.

19 Claims, 25 Drawing Sheets

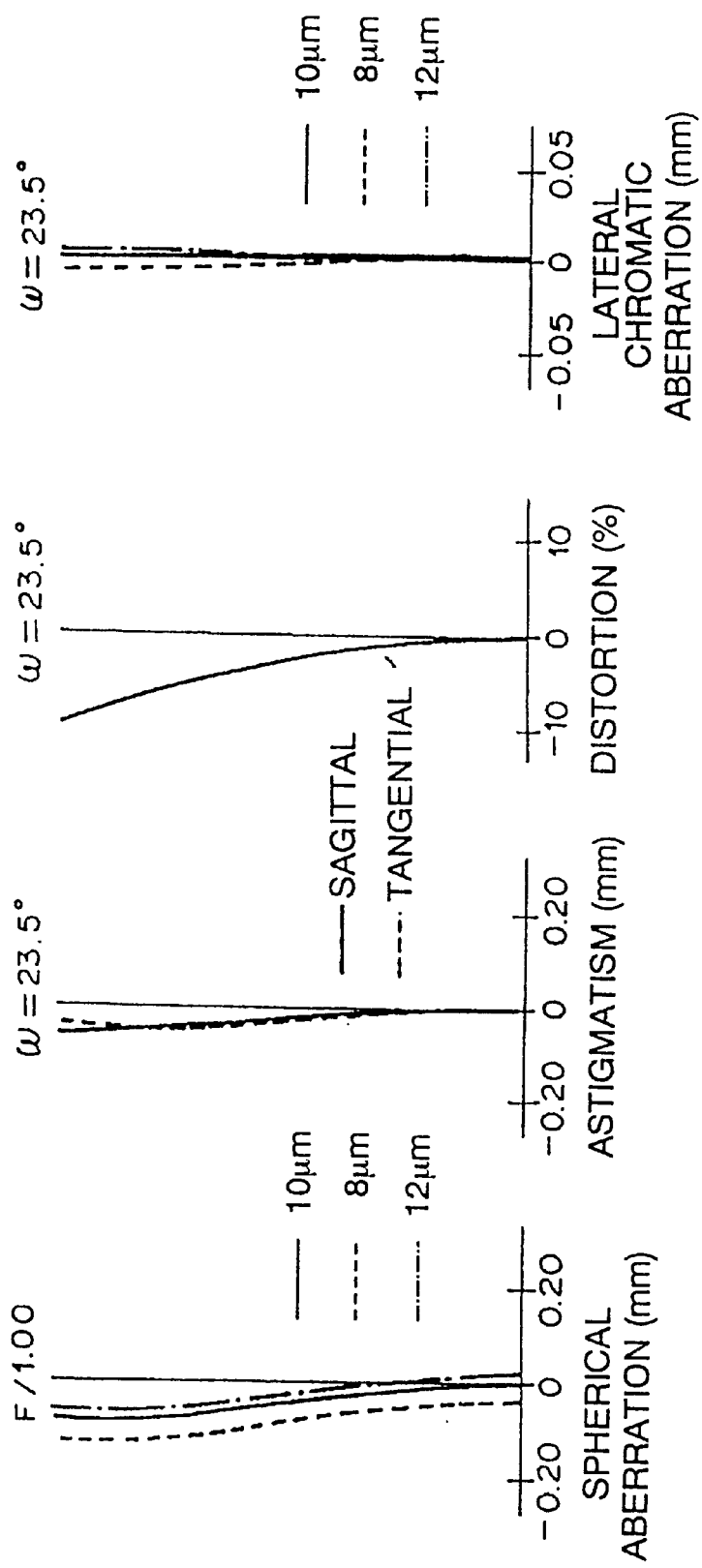

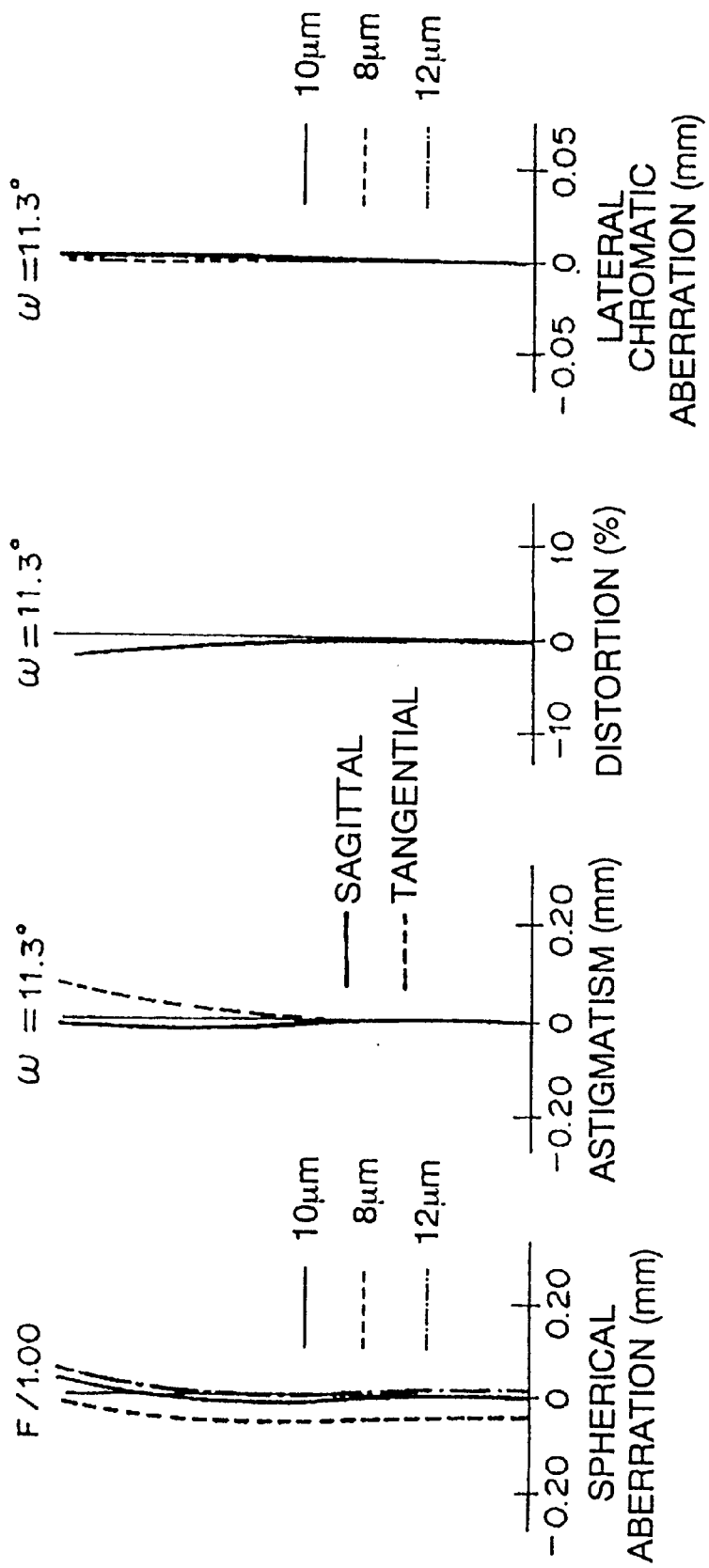

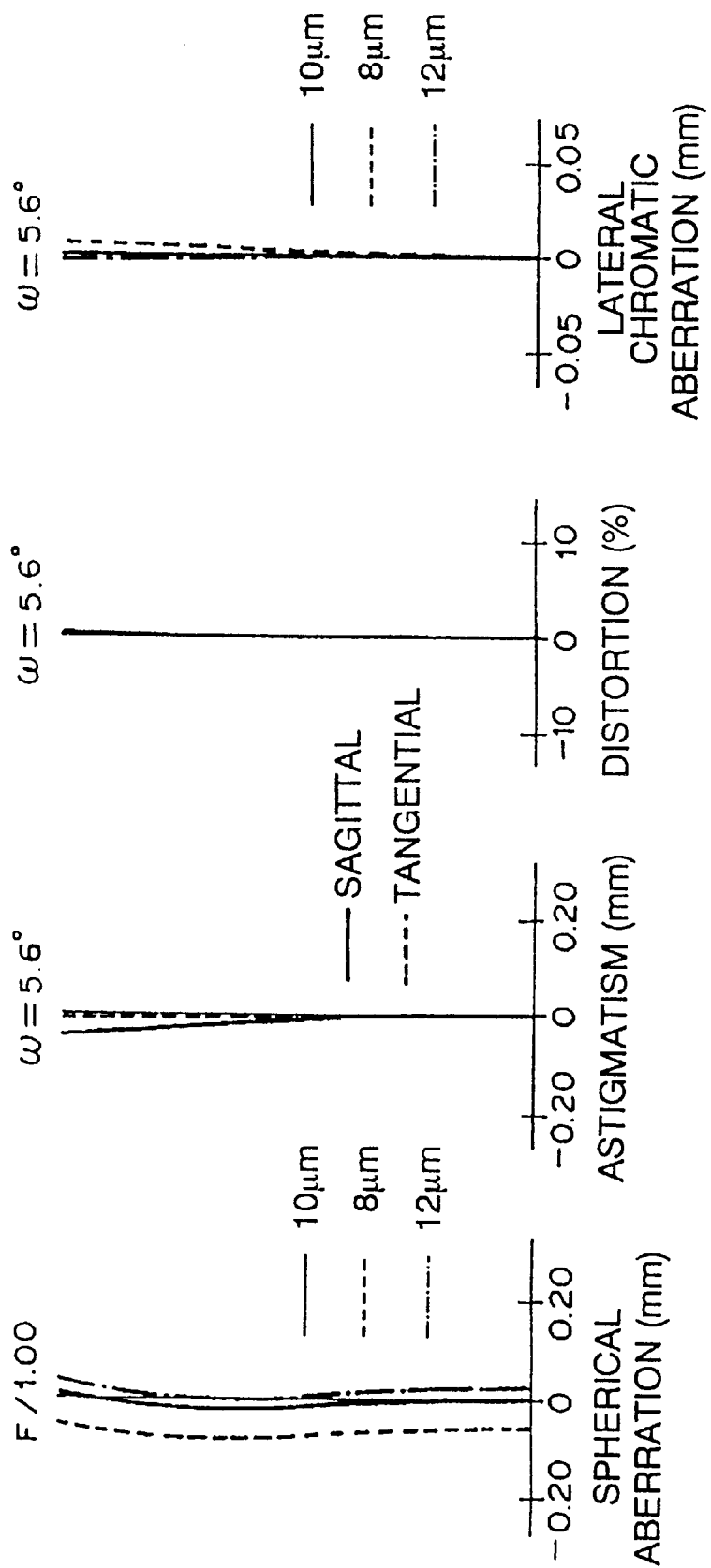

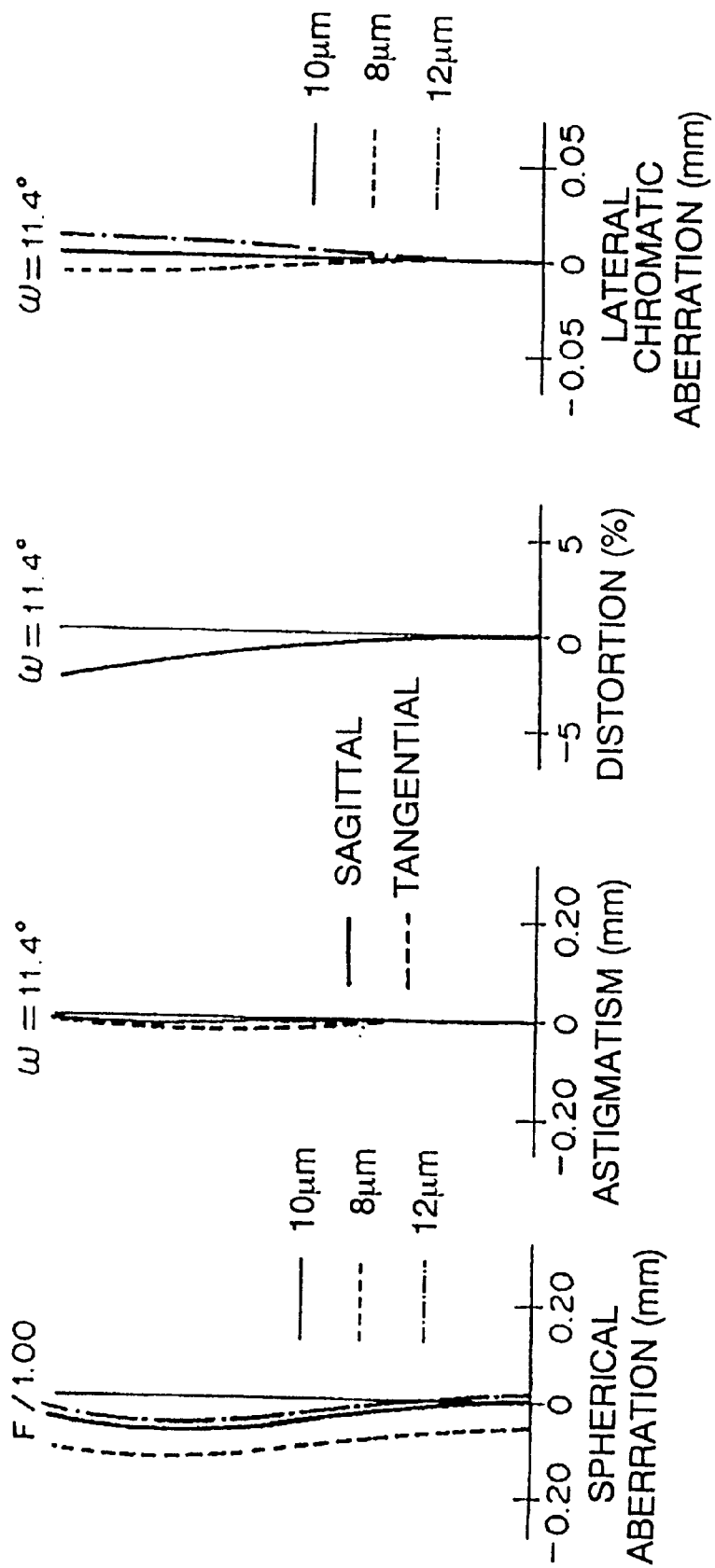

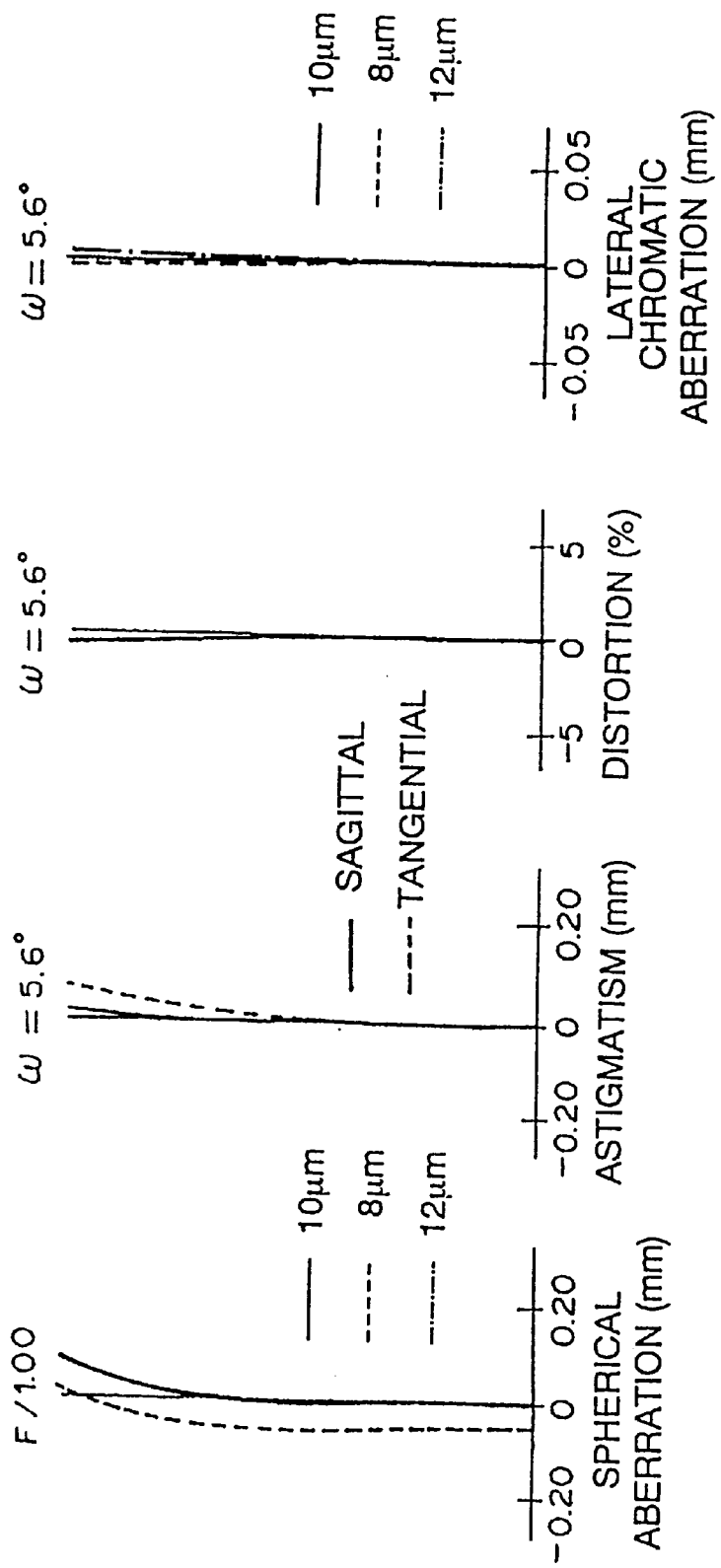

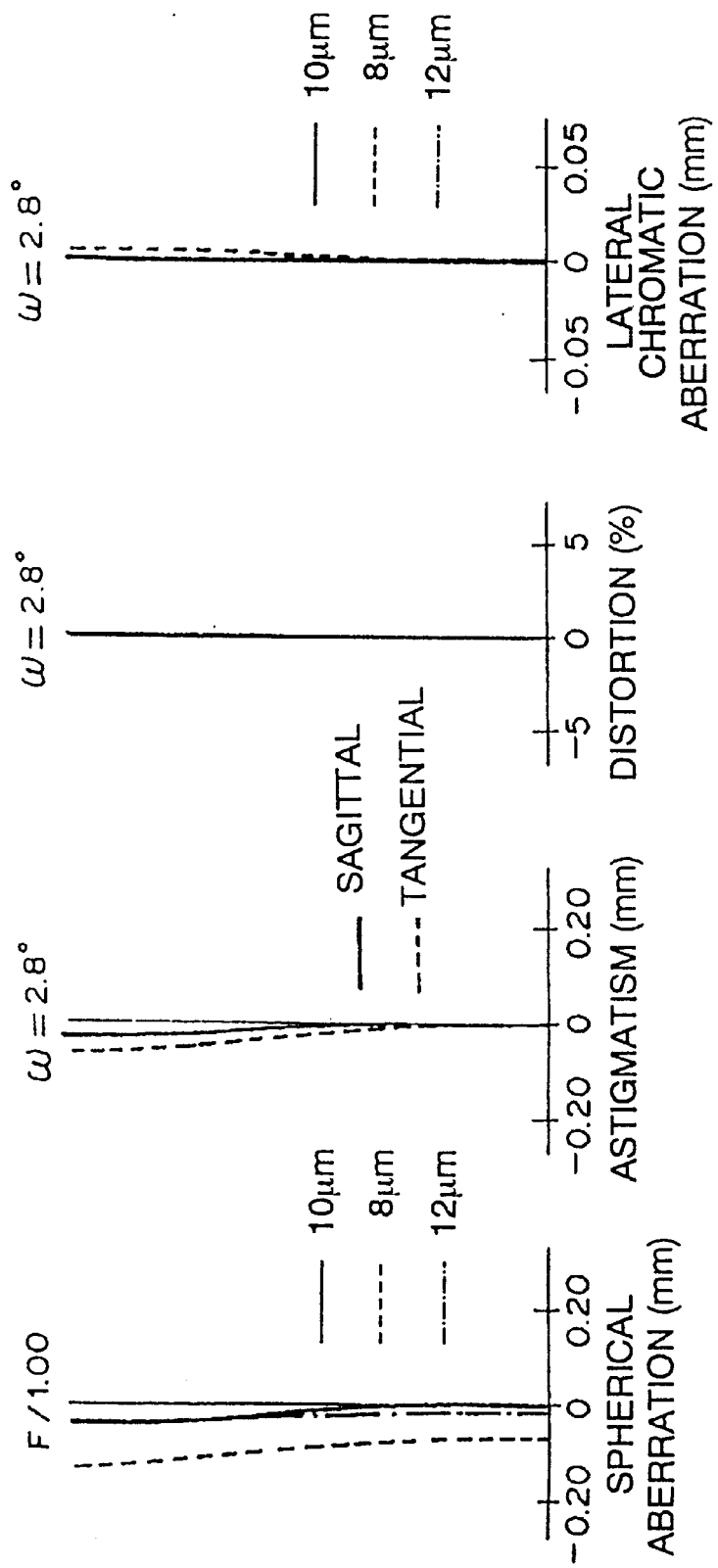

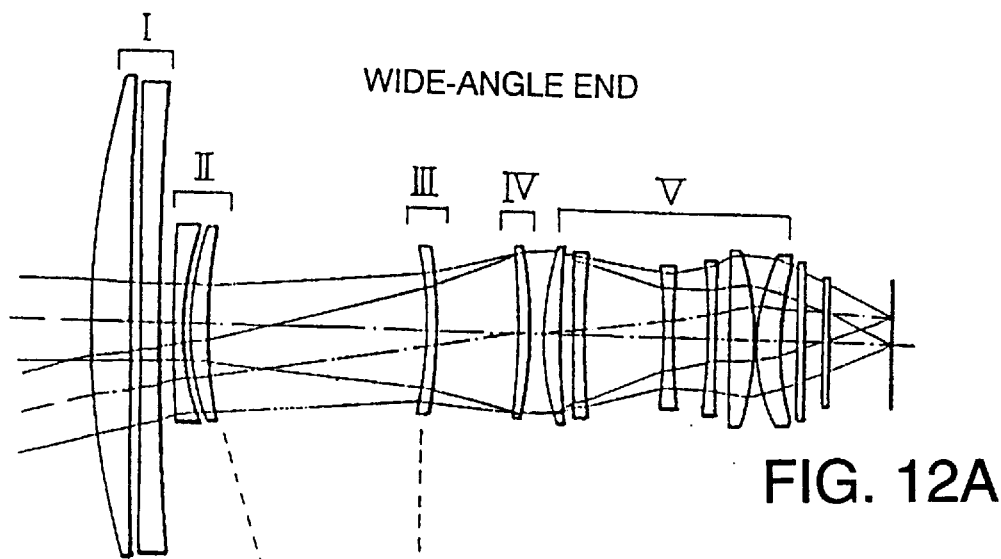
FIG. 12A  WIDE-ANGLE END
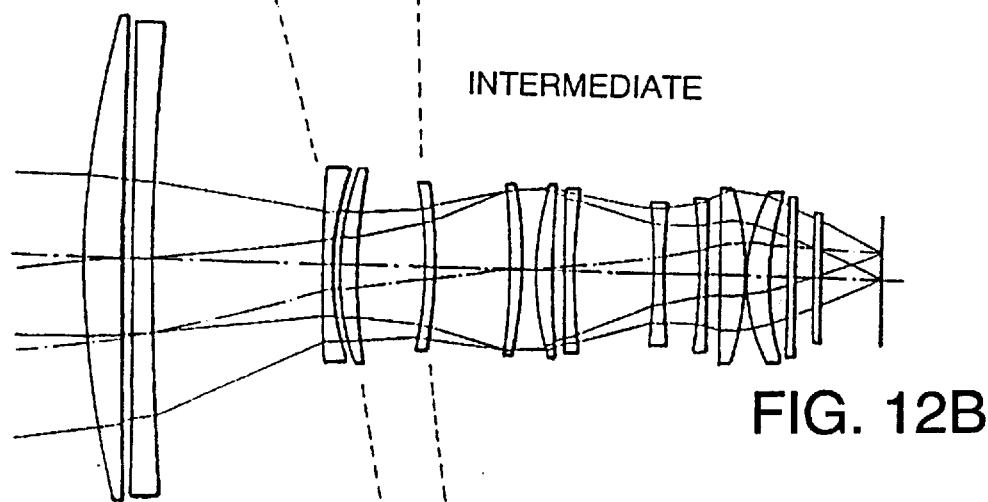
FIG. 12B  INTERMEDIATE
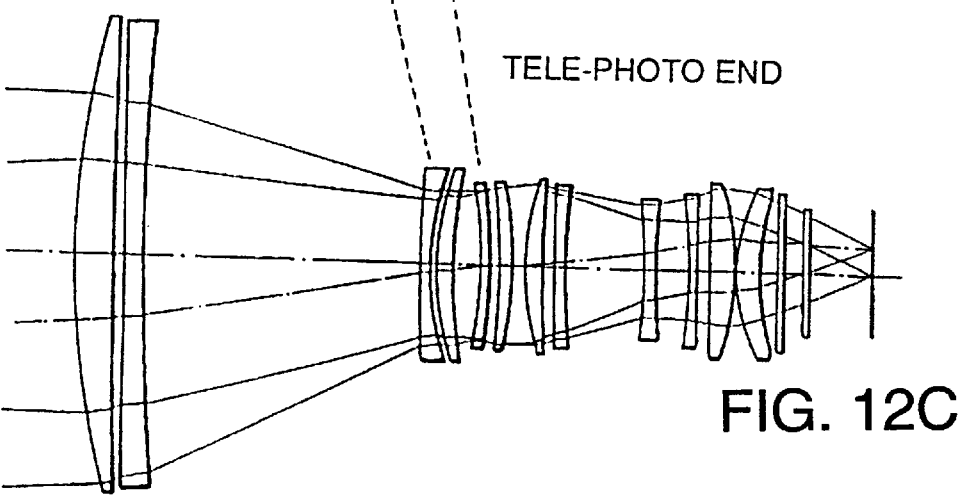
FIG. 12C  TELE-PHOTO END

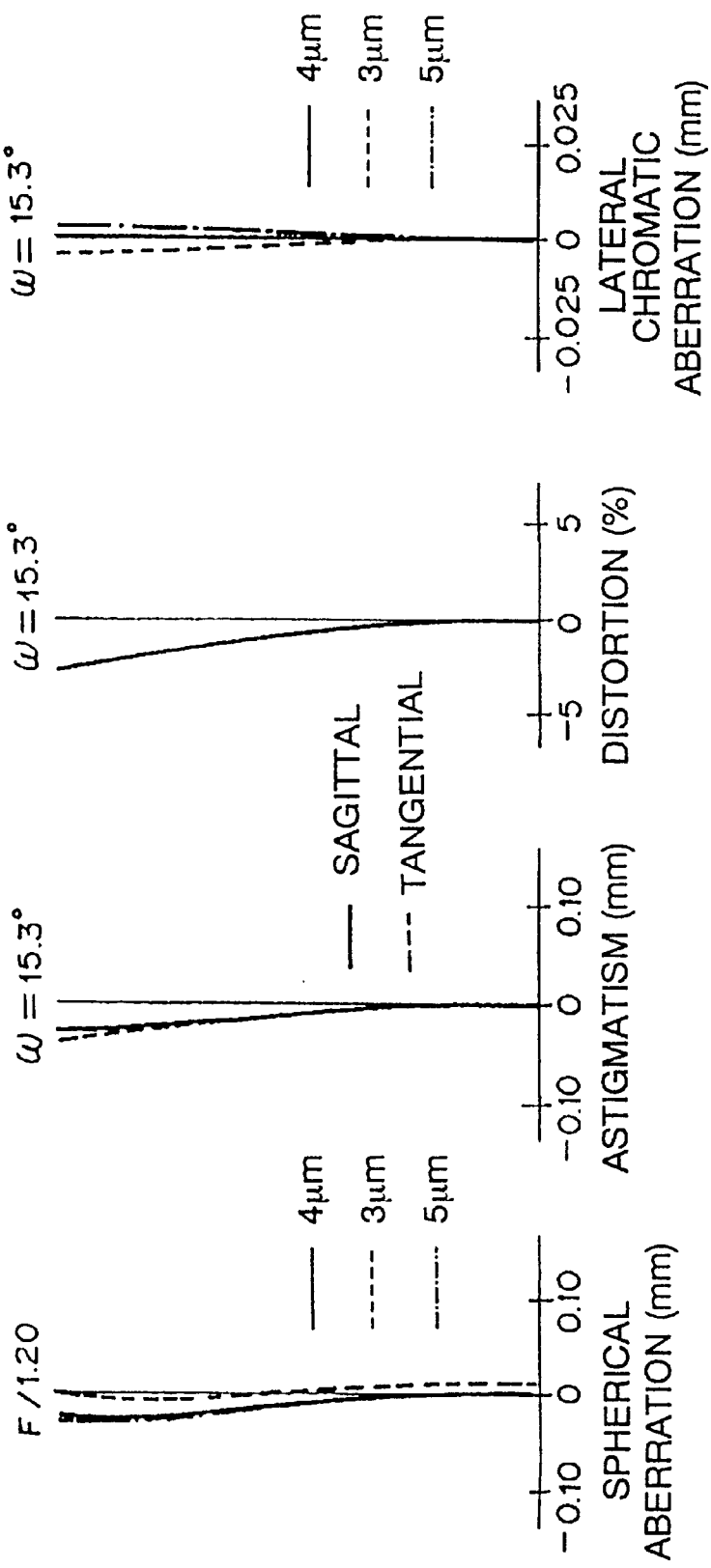

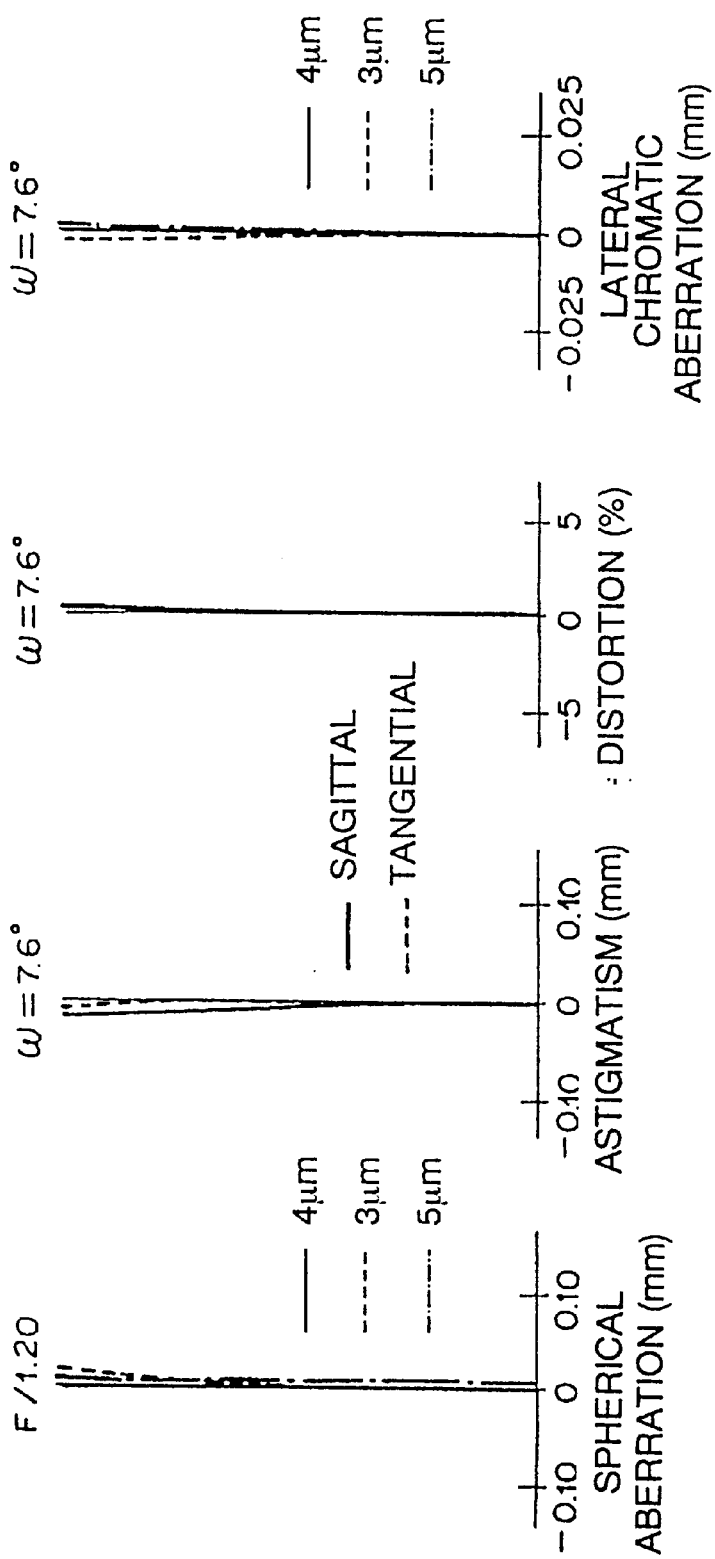

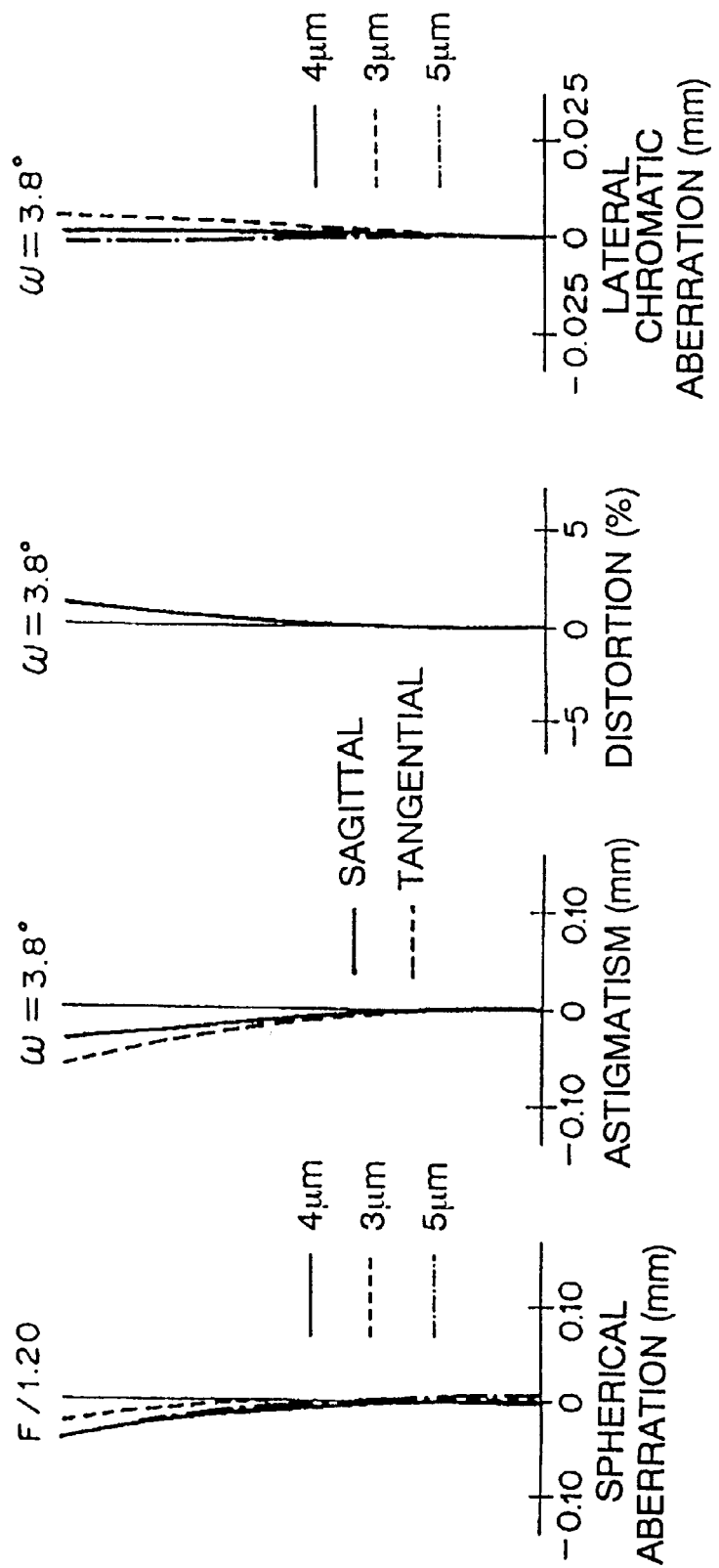

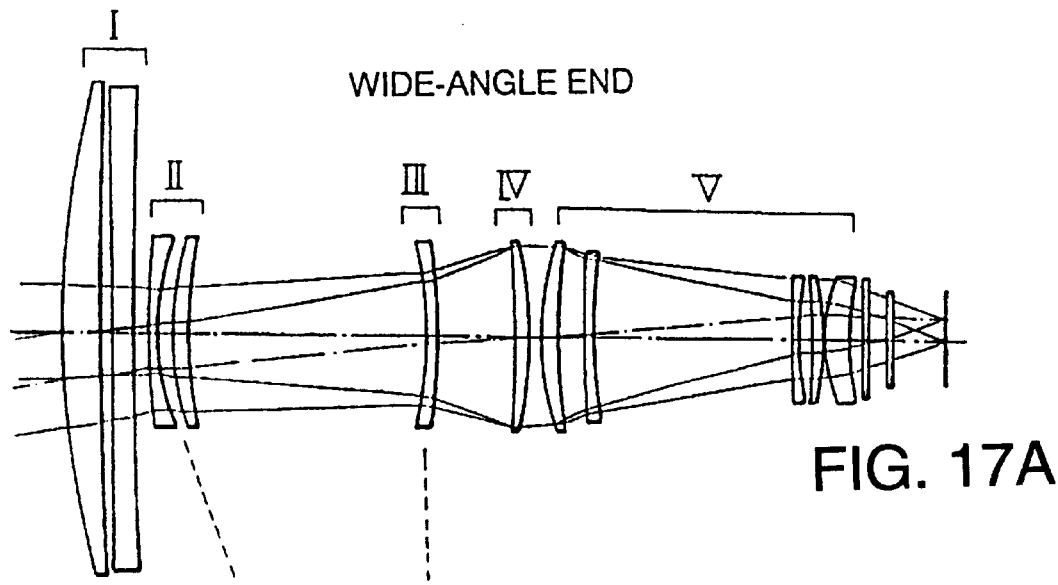
FIG. 17A WIDE-ANGLE END
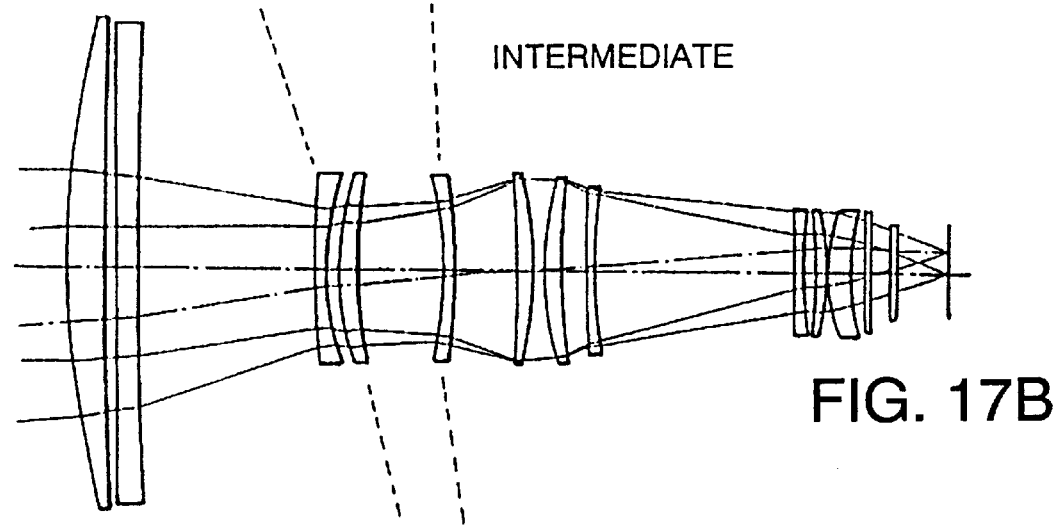
FIG. 17B INTERMEDIATE
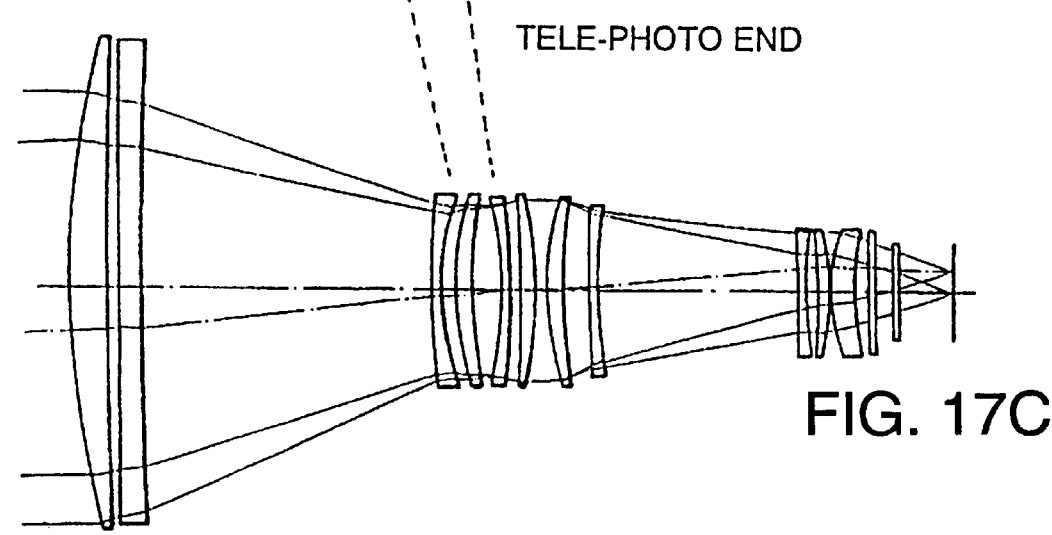
FIG. 17C TELE-PHOTO END

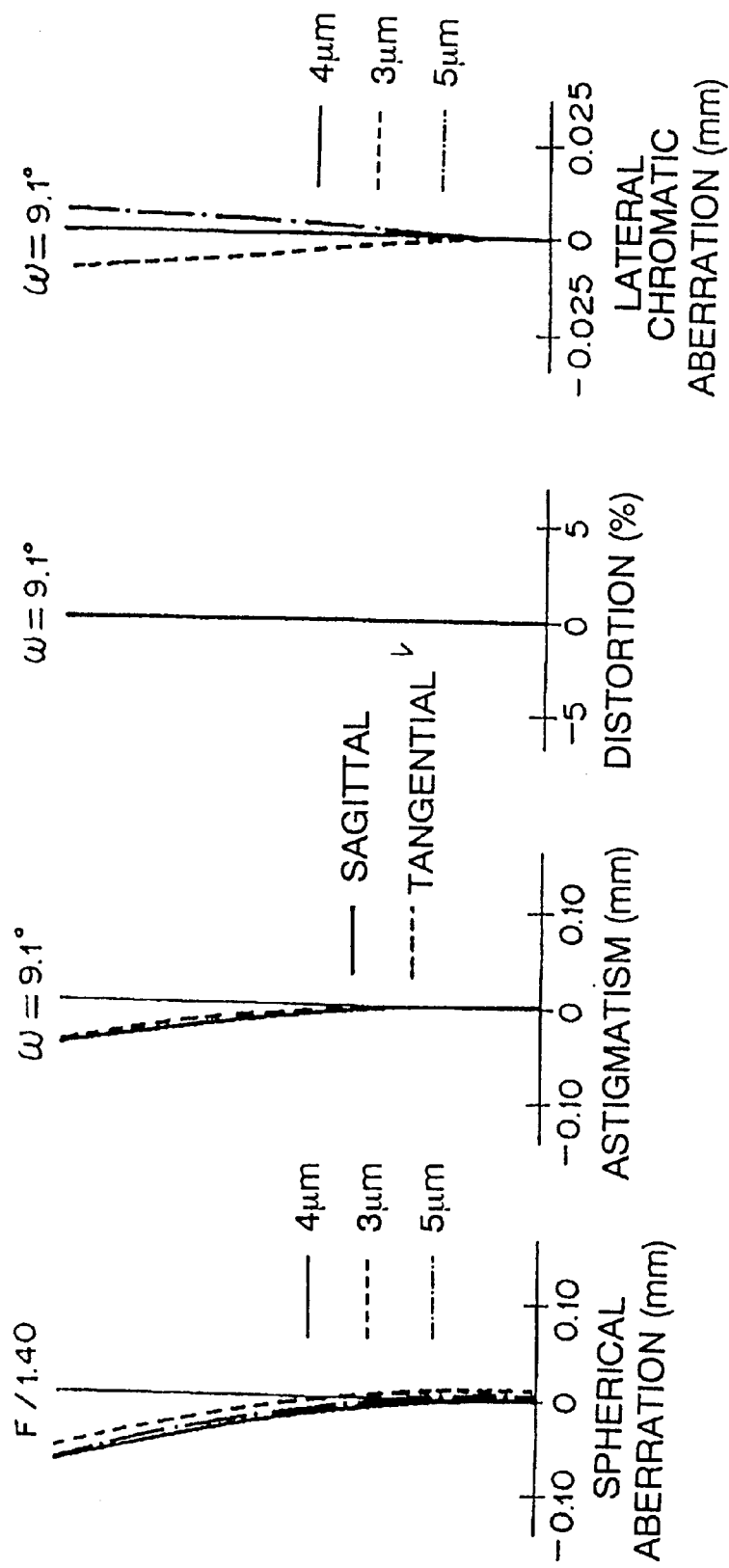

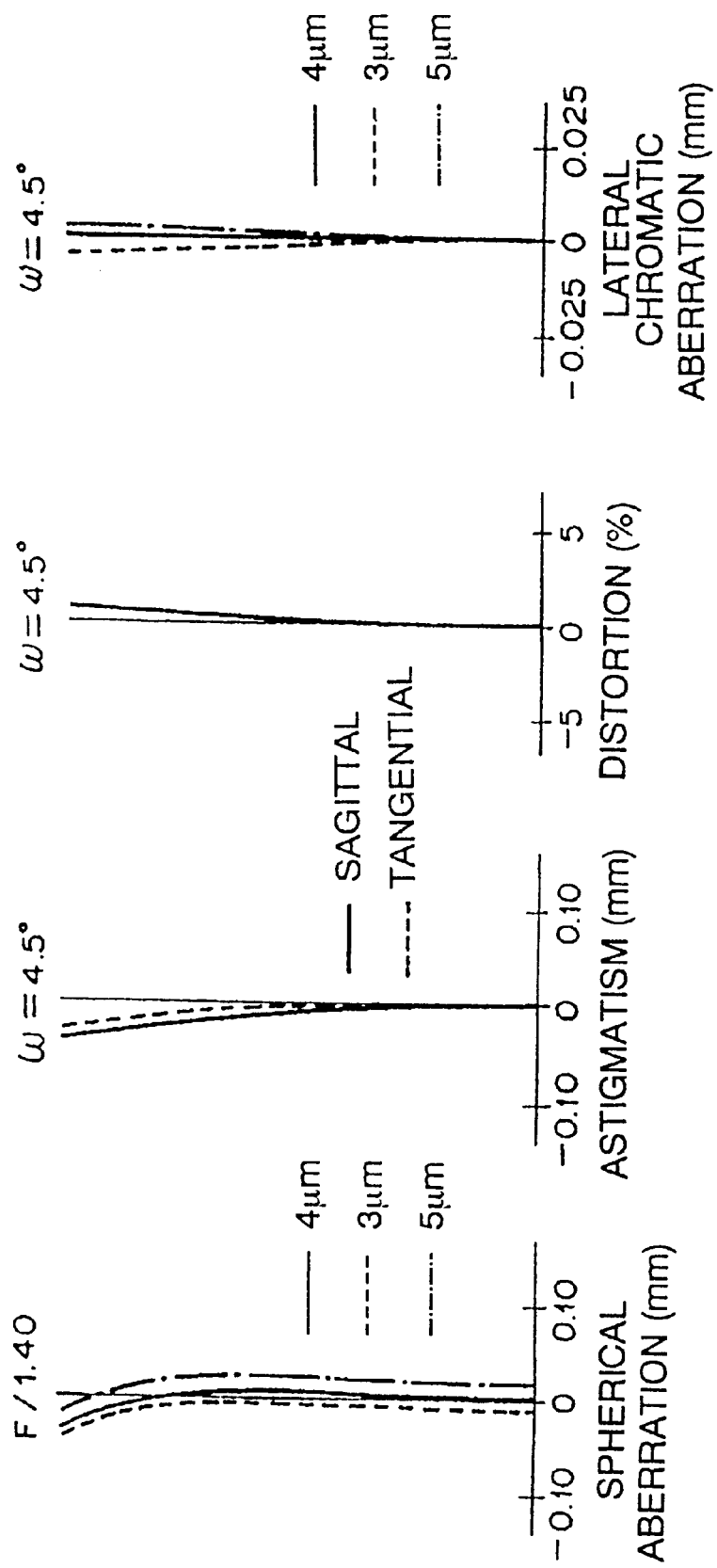

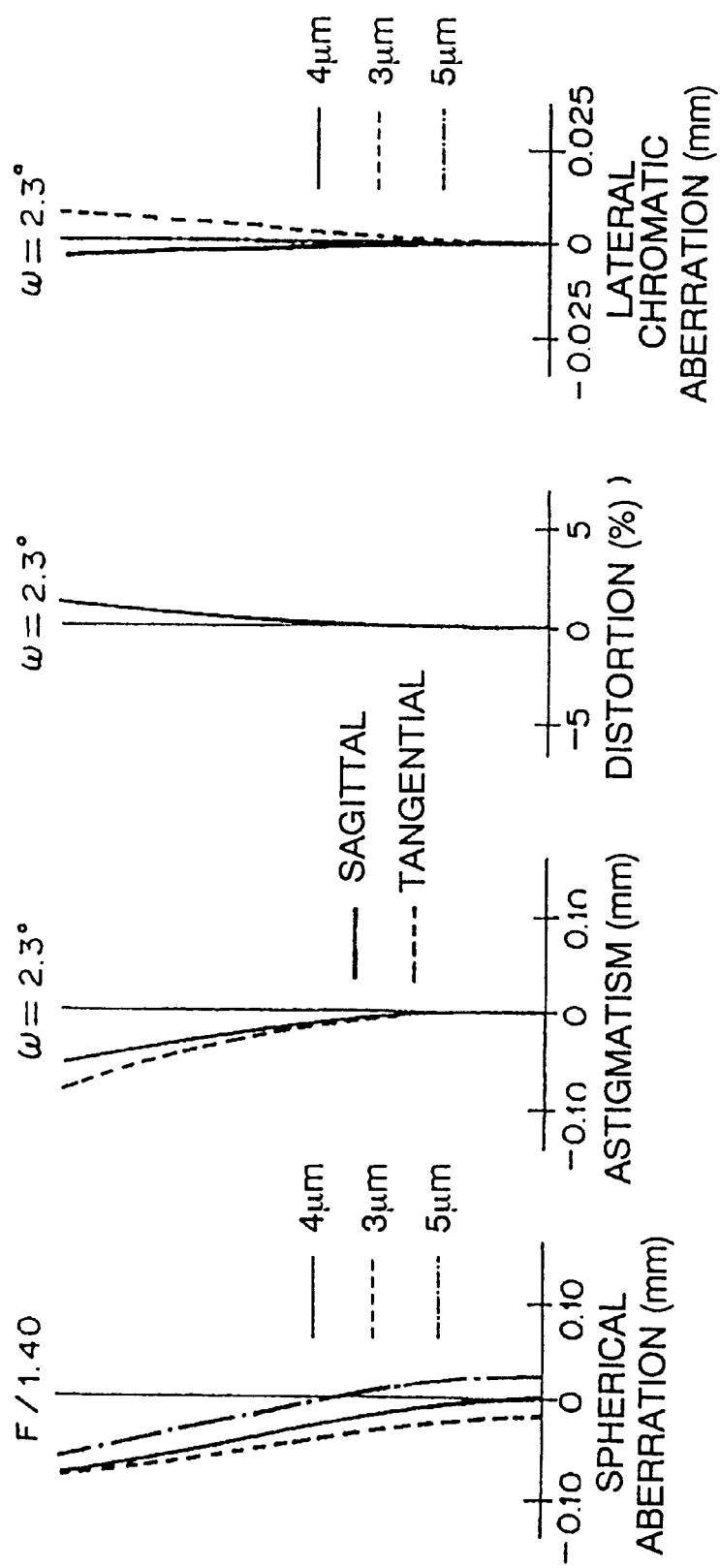

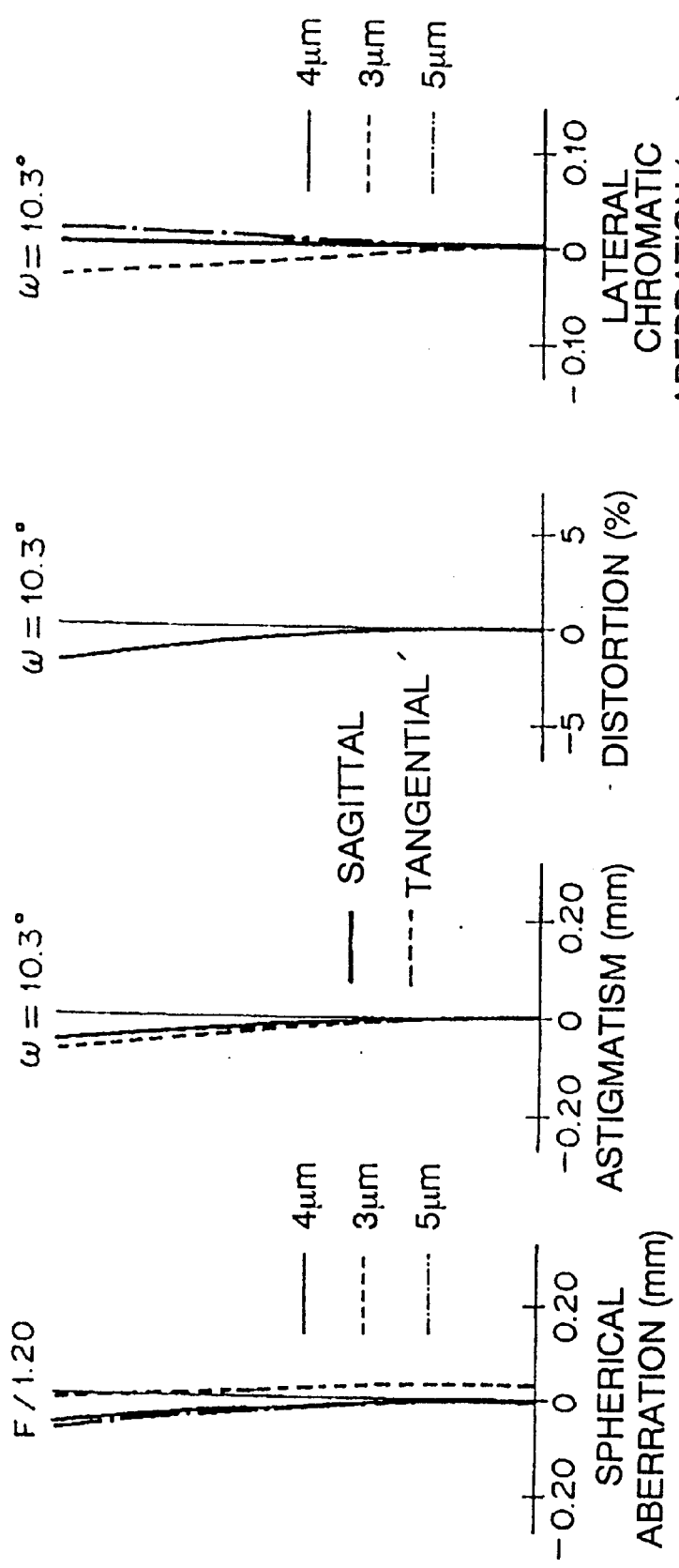

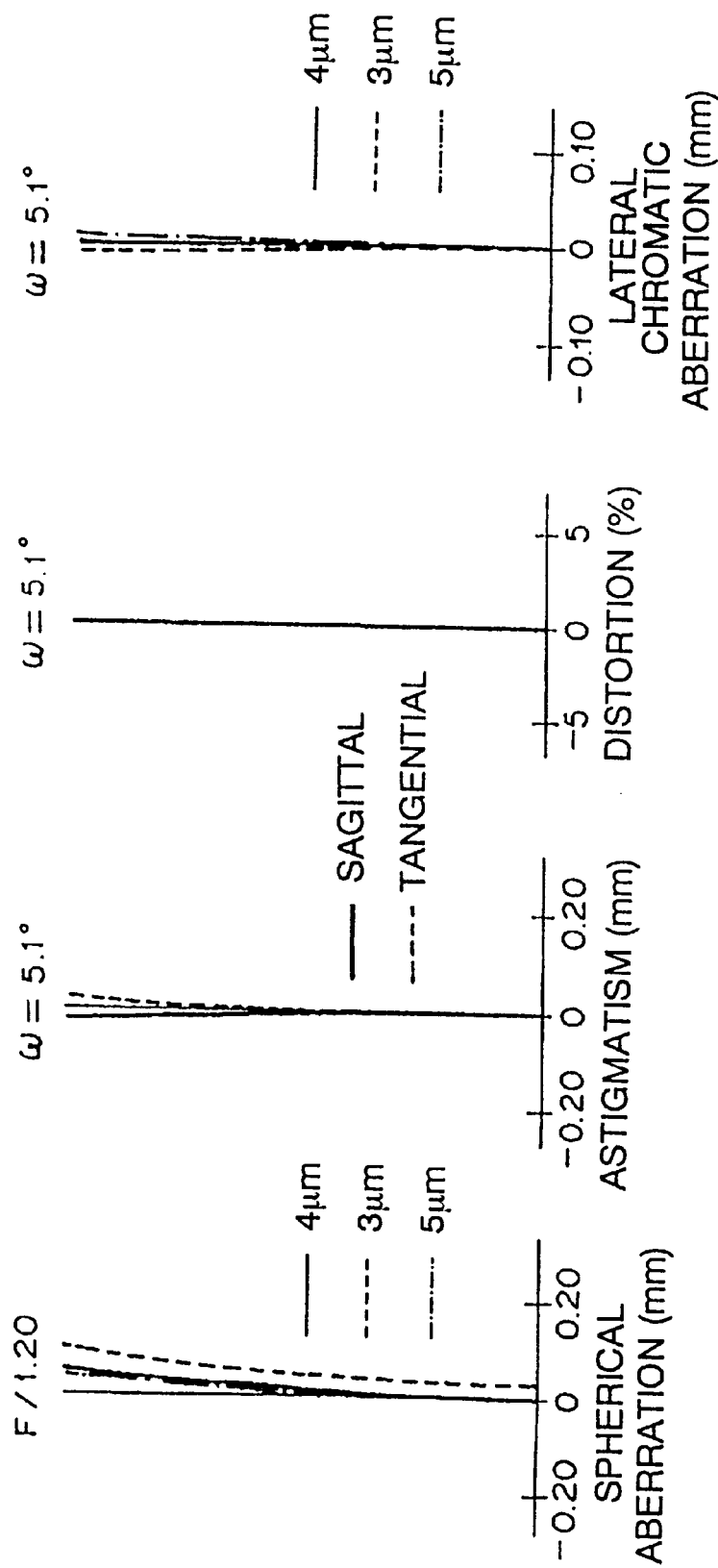

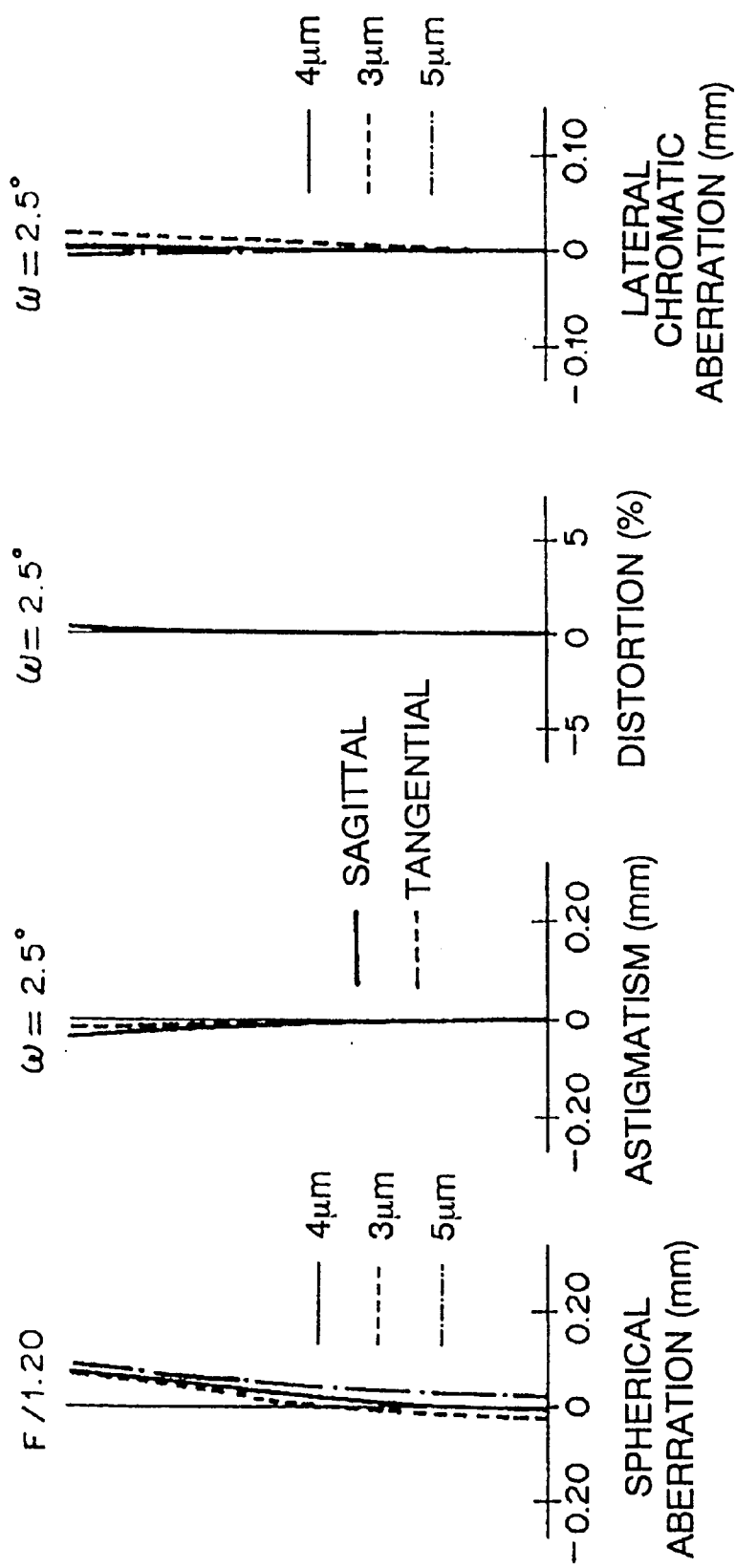

INFRARED ZOOM LENS SYSTEM

BACKGROUND OF THE INVENTION

1. Field of the Invention

This invention relates to an infrared zoom lens suitable for infrared rays over a wavelength range of, in particular, either 3 to 5 µm or 8 to 12 µm.

2. Description of Related Art

There have been proposed various infrared zoom lenses for use with a mirror scanning type of infrared optical system. Some of such infrared zoom lenses are known and are more fully disclosed in, for example, U.S. Pat. No. 4,411,488, No. 4,632,498, No. 4,659,171, No. 4,676,581 and No. 5,022,724. However, there has been no high speed and high performance infrared zoom lenses suitable for use with a two-dimensional area sensor or detector, such as the Schottky-barrier type of charge coupled device (CCD) and the hybrid type of charge coupled device (CCD) which have the advantage that no mechanical parts such as a scanning mirror are needed and high sensitivity is expected.

SUMMARY OF THE INVENTION

It is accordingly an object of the invention to provide an infrared zoom suitable for use with a two-dimensional area sensor or detector.

It is another object of the invention to provide an infrared zoom having a lens speed greater as compared with conventional infrared zoom lenses and a high imaging performance over a field of view and the entire range of zooming.

The foregoing objects of the invention is accomplished by providing an infrared zoom lens suitable for infrared rays in the spectral bands of, in particular, 3 to 5 µm and 8 to 12 µm where infrared rays from an object have superior radiation properties and less absorbed by atmospheric air. The infrared zoom lens comprises five lens groups, namely, in order from the subject end to the image end, a positive power first lens group comprising one or two lens elements, a negative power second lens group comprising one or two lens elements, a third lens group comprising a single component of a meniscus lens element with a concave subject side surface, a fourth lens group comprising a single component of convex lens element, and a positive power fifth lens group comprising at least four lens elements including a positive meniscus lens with a convex subject side surface arranged nearest an image plane. The second and third lens groups are axially movable in predetermined relation relative to each other and relative to the first, fourth and fifth lens groups which are stationary to focus and vary the focal length of the infrared zoom lens.

The infrared zoom lens must satisfy the following conditions:

$$1.00 < f_1/f_t$$
$$-0.40 > f_2/f_t$$
$$0.35 < f_5/f_t < 0.70$$

where $f_t$ is the overall focal length of the infrared zoom lens in the tele-photo end position, and $f_1$, $f_2$ and $f_5$ are the focal lengths of the first, second and fifth lens groups, respectively.

The parameters set forth are necessary for suitably balancing aberrations of the infrared zoom lens. Satisfaction of these conditions as set forth above ensures a high lens speed, a large zoom ratio and compactness of the infrared zoom lens.

According to the arrangement of the lens groups of the infrared zoom lens of the invention in which the negative power second lens group is axially moved to change the zoom ratio in cooperation with the positive power first lens group and the negative power third lens group is axially moved to maintain constant focus in cooperation with the positive power fourth lens group, changes in aberrations, in particular coma, astigmatism and curvature of field, due to in a change in zoom setting are extremely reduced, so as thereby to make it possible that the infrared zoom lens forms a sharp image not only over the field-of-view thereof but also over the range of zooming thereof.

If the limit of the ratio of $f_1/f_t$ is exceeded, while the infrared zoom lens can have a short overall length, aggravation of spherical aberrations and coma is enhanced, which is always undesirable for the infrared zoom lens to have a high lens speed and provide a high image quality. In addition, changing the zoom ratio, or the focal length, of the infrared zoom lens is accompanied by significant changes in astigmatism and curvature of field, which imposes restraints on the zoom ratio of the infrared zoom lens.

If the limit of the ratio of $f_2/f_t$ is exceeded, changes in various aberrations, in particular spherical aberrations, coma and aberrations on image surface, due to in a change in zoom setting are enhanced, and hence it is hard for the infrared zoom lens to have a higher speed and a larger zoom ratio.

If the lower limit of the ratio of $f_5/f_t$ is exceeded, while the infrared zoom lens can be constructed to be small in overall length, changes in various aberrations, in particular spherical aberrations, coma and aberrations on image surface, namely astigmatism and field curvature, due to in a change in zoom setting are enhanced, and hence it is hard for the infrared zoom lens to have a long back focal distance as well as a higher speed and a larger zoom ratio. Further, if the upper limit of the ratio $f_5/f_t$ is exceeded, it is hard not only to reduce the overall length of the zoom lens but also to install small diameters of lens elements for the fifth lens group and a small diameter of diaphragm in the infrared zoom lens, which is always undesirable for the zoom lens to provide overall compactness.

BRIEF DESCRIPTION OF THE DRAWINGS

The above and other objects and features of the present invention will be understood from the following description of a specific embodiment thereof when considering in conjunction with the accompanying drawings, in which:

FIGS. 3A–3D are graphical views showing curves of spherical aberrations for wavelengths of 8, 10 and 12 µm, astigmatism in sagittal and tangential planes, distortion, and lateral chromatic aberrations for wavelengths of 8, 10 and 12 µm of the infrared zoom lens of FIG. 1 which is in the wide angle end position;

FIGS. 4A–4D are graphical views showing curves of spherical aberrations for wavelengths of 8, 10 and 12 µm, astigmatism in sagittal and tangential planes, distortion, and lateral chromatic aberrations for wavelengths of 8, 10 and 12 µm of the infrared zoom lens of FIG. 1 which is in the intermediate position;

FIGS. 5A–5D are graphical views showing curves of spherical aberrations for wavelengths of 8, 10 and 12 µm, astigmatism in sagittal and tangential planes, distortion, and lateral chromatic aberrations for wavelengths of 8, 10 and 12 µm of the infrared zoom lens of FIG. 1 which is in the tele-photo end position;

FIGS. 8A–8D are graphical views showing curves of spherical aberrations for wavelengths of 8, 10 and 12 µm, astigmatism in sagittal and tangential planes, distortion, and lateral chromatic aberrations for wavelengths of 8, 10 and 12 µm of the infrared zoom lens of FIG. 6 which is in the wide angle end position;

FIGS. 9A–9D are graphical views showing curves of spherical aberrations for wavelengths of 8, 10 and 12 µm, astigmatism in sagittal and tangential planes, distortion, and lateral chromatic aberrations for wavelengths of 8, 10 and 12 µm of the infrared zoom lens of FIG. 6 which is in the intermediate position;

FIGS. 10A–10D are graphical views showing curves of spherical aberrations for wavelengths of 8, 10 and 12 µm, astigmatism in sagittal and tangential planes, distortion, and lateral chromatic aberrations for wavelengths of 8, 10 and 12 µm of the infrared zoom lens of FIG. 6 which is in the tele-photo end position;

FIGS. 12A–12C are diagrammatic side views of the infrared zoom lens shown in FIG. 11 showing relative positions of component lenses in a wide angle end position, an intermediate position, and a tele-photo end position, respectively;

FIGS. 13A–13D are graphical views showing curves of spherical aberrations for wavelengths of 3, 4 and 5 µm, astigmatism in sagittal and tangential planes, distortion, and lateral chromatic aberrations for wavelengths of 3, 4 and 5 µm of the infrared zoom lens of FIG. 11 which is in the wide angle end position;

FIGS. 14A–14D are graphical views showing curves of spherical aberrations for wavelengths of 3, 4 and 5 µm, astigmatism in sagittal and tangential planes, distortion, and lateral chromatic aberrations for wavelengths of 3, 4 and 5 µm of the infrared zoom lens of FIG. 11 which is in the intermediate position;

FIGS. 15A–15D are graphical views showing curves of spherical aberrations for wavelengths of 3, 4 and 5 µm, astigmatism in sagittal and tangential planes, distortion, and lateral chromatic aberrations for wavelengths of 3, 4 and 5 µm of the infrared zoom lens of FIG. 11 which is in the tele-photo end position;

FIGS. 17A–17C are diagrammatic side views of the infrared zoom lens shown in FIG. 16 showing relative positions of component lenses in a wide angle end position, an intermediate position, and a tele-photo end position, respectively;

FIGS. 18A–18D are graphical views showing curves of spherical aberrations for wavelengths of 3, 4 and 5 µm, astigmatism in sagittal and tangential planes, distortion, and lateral chromatic aberrations for wavelengths of 3, 4 and 5 µm of the infrared zoom lens of FIG. 16 which is in the wide angle end position;

FIGS. 19A–19D are graphical views showing curves of spherical aberrations for wavelengths of 3, 4 and 5 µm, astigmatism in sagittal and tangential planes, distortion, and lateral chromatic aberrations for wavelengths of 3, 4 and 5 µm of the infrared zoom lens of FIG. 16 which is in the intermediate position;

FIGS. 20A–20D are graphical views showing curves of spherical aberrations for wavelengths of 3, 4 and 5 µm, astigmatism in sagittal and tangential planes, distortion, and lateral chromatic aberrations for wavelengths of 3, 4 and 5 µm of the infrared zoom lens of FIG. 16 which is in the telephoto end position;

FIGS. 23A–23D are graphical views showing curves of spherical aberrations for wavelengths of 3, 4 and 5 µm, astigmatism in sagittal and tangential planes, distortion, and lateral chromatic aberrations for wavelengths of 3, 4 and 5 µm of the infrared zoom lens of FIG. 21 which is in the wide angle end position;

FIGS. 24A–24D are graphical views showing curves of spherical aberrations for wavelengths of 3, 4 and 5 µm, astigmatism in sagittal and tangential planes, distortion, and lateral chromatic aberrations for wavelengths of 3, 4 and 5 µm of the infrared zoom lens of FIG. 21 which is in the intermediate position; and FIGS. 25A–25D are graphical views showing curves of spherical aberrations for wavelengths of 3, 4 and 5 µm, astigmatism in sagittal and tangential planes, distortion, and lateral chromatic aberrations for wavelengths of 3, 4 and 5 µm of the infrared zoom lens of FIG. 21 which is in the telephoto end position.

DETAILED DESCRIPTION OF THE SPECIFIC EMBODIMENT

Figure 1:
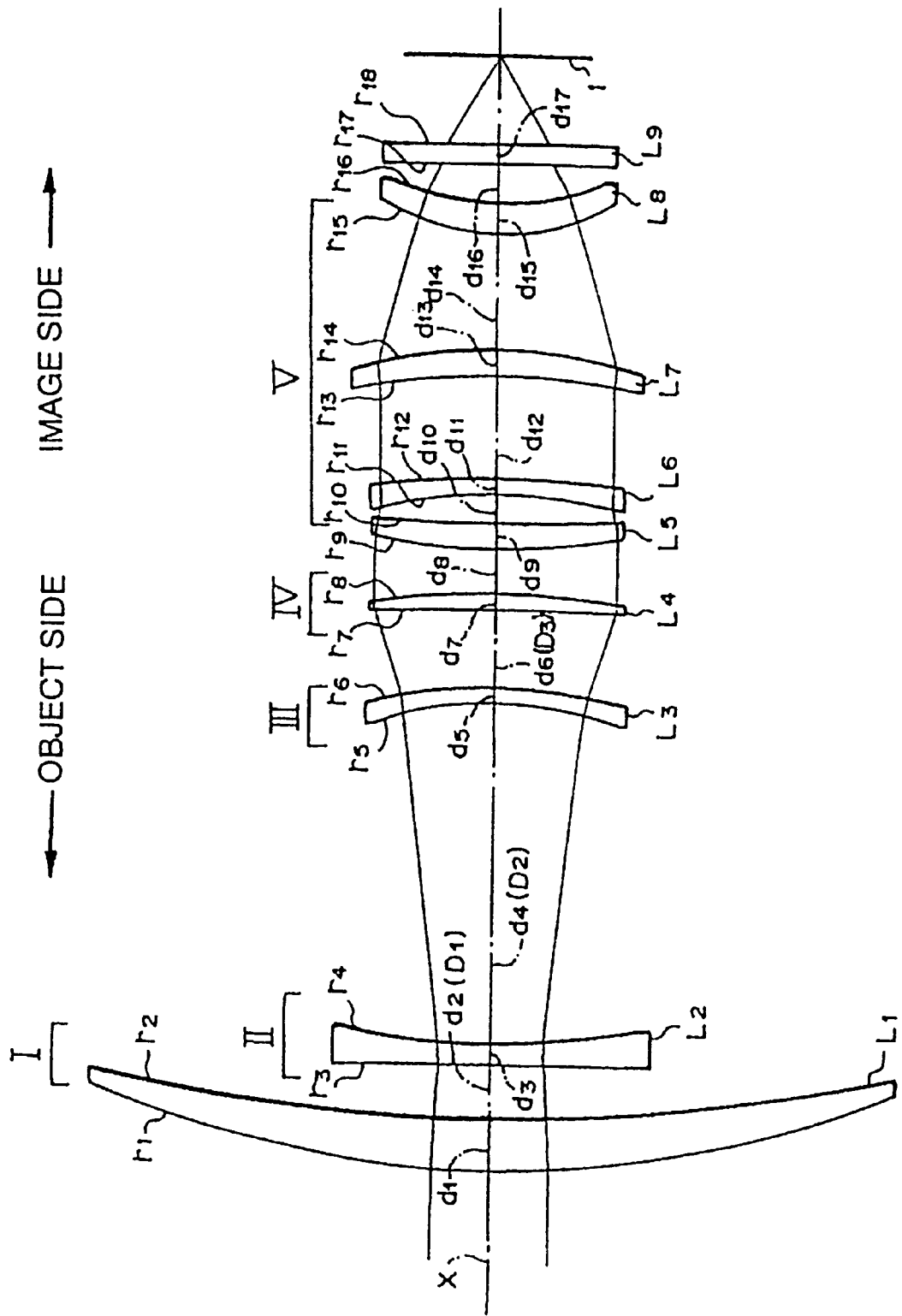
FIG. 1 is a diagrammatic side view of a basic optical structure of an infrared zoom lens, which is in a wide angle end position, in accordance with a first embodiment of the invention.

Referring to the drawings in detail, an infrared zoom lens suitable for infrared rays over a wavelength range of, in particular, 3 to 5 µm or 8 to 12 µm, comprises a positive power first lens group, a negative power second lens group, a third lens group, a fourth lens group and a positive power fifth lens group, arranged in this order from the subject end to the image end. The second and third lens groups are axially movable in predetermined relation relative to each other and relative to the first, fourth and fifth lens groups which are stationary to focus an image of a subject on an image plane and vary the zoom ratio of the infrared zoom lens.

Positive power first lens group comprises a single convex lens element made of material of which the dispersion is small, or otherwise two lens elements made of different materials of which the dispersion are different. In the case where a two lens element first lens group is employed, the infrared zoom lens is provided with well corrected lateral chromatic aberrations and, if having a long zoom setting and a large zoom ratio, yields excellent optical performance, i.e. the properties of forming an image with well enhanced contrast and high resolution. For the infrared zoom lens suitable for infrared rays over a wavelength range of 3 to 5 $\mu$m, while it is most preferable for the first lens group to consist of two lens elements, one of which is a convex lens made of silicon and the other of which is a concave lens made of germanium, for the reason that materials which consist infrared rays are generally expensive, the first lens group may consist of only a single lens having a large diameter made of silicon of which the dispersion is small. On the other hand, for use with an infrared system suitable for infrared rays over a wavelength range of 8 to 12 $\mu$m, the first lens group may consist of only a single lens made of germanium of which the dispersion is significantly less. The first lens group may be axially movable as a supplementary focusing means.

Negative power second lens group comprises a single concave lens element made of material of which the dispersion is small, or otherwise two lens elements made of different materials of which the dispersion are different. In the case where a two lens element first lens group is employed, the infrared zoom lens is provided with well corrected longitudinal chromatic aberrations and, if having a long zoom setting, yields excellent optical performance. For the infrared zoom lens suitable for infrared rays over a wavelength range of 3 to 5 $\mu$m, it is most preferable for the second lens group to consist of two lens elements, one of which is a concave silicon lens and the other of which is a convex germanium lens. For the infrared zoom lens having a short zoom setting or a relatively small zoom ratio, the second lens group may, however, consist of only one lens element made of silicon of which the dispersion is small. On the other hand, for the infrared zoom lens suitable for infrared rays over a wavelength range of 8 to 12 $\mu$m, the second lens group most preferably consists of two lens elements, one of which is a zinc selenide lens and the other of which is a germanium lens. Because the dispersion of germanium is significantly small, a single germanium lens element may be employed for the second lens group.

Third lens group comprises a negative power lens element consisting of a single meniscus lens having a concave subject side surface with which the infrared zoom lens yields improvement of a change in aberrations such as, in particular, spherical aberrations, coma and aberrations on image surface due to a change in zoom ratio.

Fourth lens group comprises a single convex lens element such as an almost afocal component which works such that the light rays leaving the almost afocal lens element and entering the fifth lens group remain nearly parallel.

Positive power fifth lens group comprises a front part positive power component to provide corrections for spherical aberrations and longitudinal chromatic aberrations and a rear part component to provide corrections for coma, astigmatism and curvature of field, each of the front and rear components consisting of at least two lens elements. The rear part component includes a positive power meniscus lens with a concave image side surface arranged directly facing an image plane.

Infrared zoom lens may be provided with a diaphragm or aperture stop disposed between the fourth and fifth lens group which always desirable for the infrared zoom lens to make use of almost 100% of incident light rays covering the entire area of the field-of-view.

The infrared zoom lens must satisfy the following conditions:

| | |
|---|---|
| 1.00 < f1/ft | (I) |
| −0.40 > f2/ft | (II) |
| 0.35 < f5/ft < 0.70 | (III) | where $f_t$ is the overall focal length of the infrared zoom lens in the tele-photo end position, and $f_1$, $f_2$ and $f_5$ are the focal lengths of the first, second and fifth lens groups, respectively.

The following description will be directed to various infrared zoom lenses embodying the present invention.

EXAMPLE I

Figure 2A:
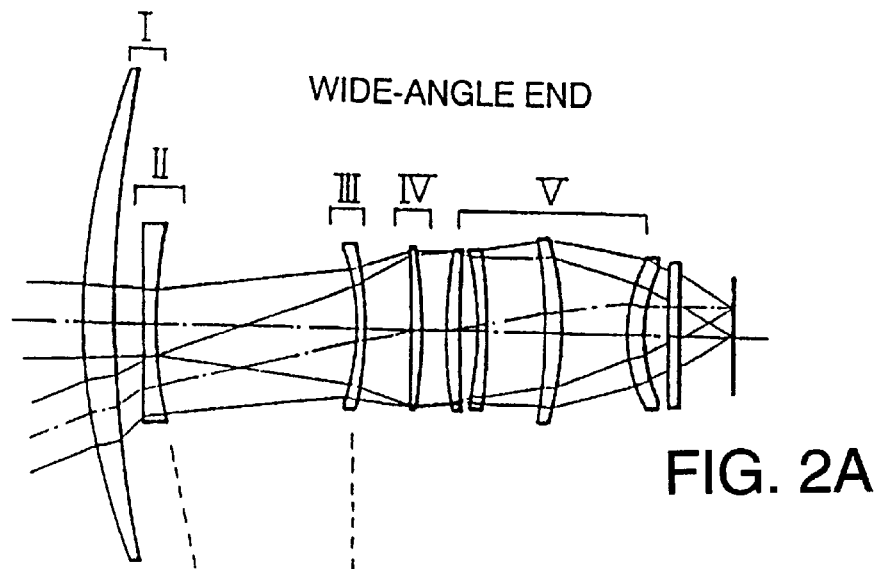
FIGS. 2A–2C are diagrammatic side views of the infrared zoom lens shown in FIG. 1 showing relative positions of component lenses in a wide angle end position, an intermediate position, and a tele-photo end position, respectively.
Figure 2B:
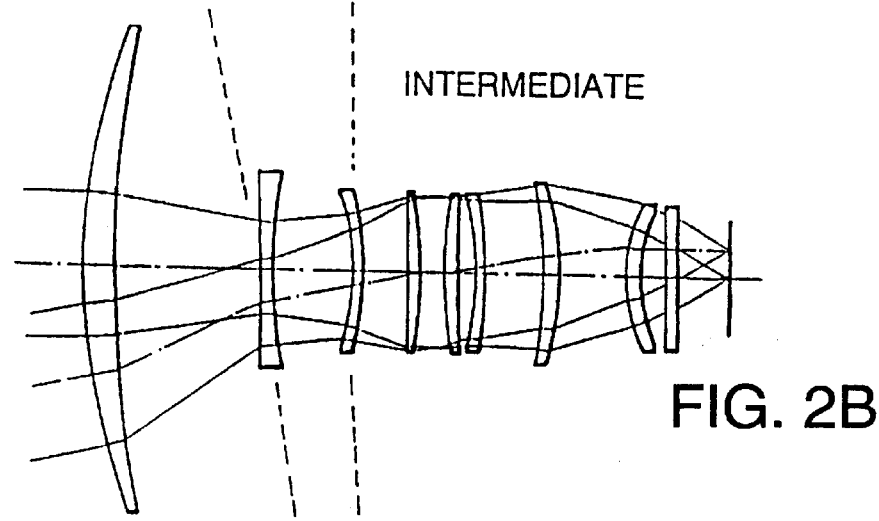
Figure 2C:
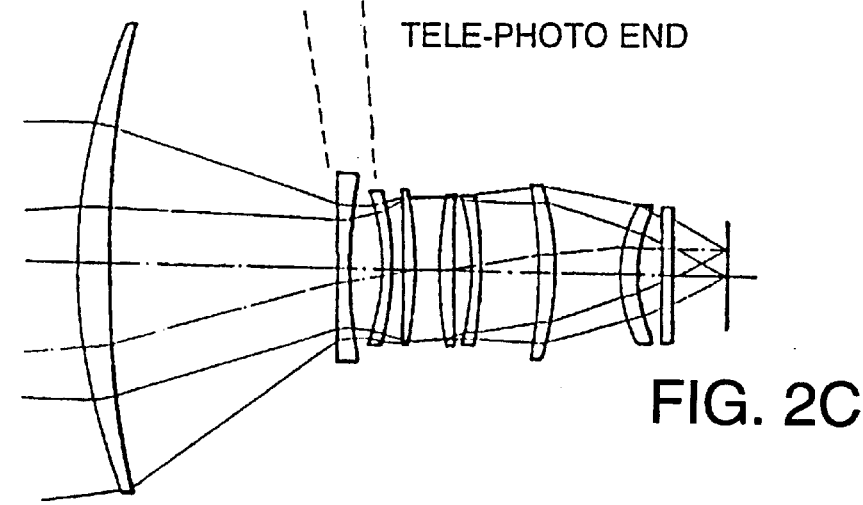

FIG. 1 shows an infrared zoom lens in accordance with an embodiment of the invention which is in a wide-angle end position or at a shortest zoom setting, and FIGS. 2A, 2B and 2C show the positional relationship of the infrared zoom lens of FIG. 1 at a wide-angle end position or at a shortest zoom setting, at an intermediate zoom setting, and a tele-photo end position or the longest zoom setting, respectively.

As shown in FIG. 1, the infrared zoom lens comprises five lens groups, arranged in order from the subject end to the image end, a positive power first lens group I, a negative power second lens group II, a third lens group III, a fourth lens group IV, a positive power fifth lens group V. Further, the infrared zoom lens is provided with a dewar window element $L_W$ forming a part of a dewar assembly (which is not shown but may be of any well known type) placed between the fifth lens group V and an image plane 1. The second and third lens groups II and III are axially movable along an optical axis X in predetermined relation relative to each other and relative to the first, fourth and fifth lens groups II, IV and V which are stationary. During zooming the second lens group II works for varying the focal length, or the zoom ratio, of the infrared zoom lens, the third lens group III works for forming a sharp image on the image plane 1.

Specifically, each of the first, second, third and fourth lens groups I, II, III and IV comprises a single lens element $L_1$, $L_2$, $L_3$, $L_4$, and the fifth lens group V comprises four lens elements $L_5$–$L_8$. Each of the first, fifth and eighth lens elements $L_1$, $L_5$ and $L_8$ consists of a positive power single meniscus lens having a convex subject side surface; each of the fourth and seventh lens elements $L_4$ and $L_7$ consists of a positive power single meniscus lens having a convex image side surface; the second lens element $L_2$ consists of a negative power single meniscus lens having a concave image side surface; and each of the third and sixth lens elements $L_3$ and $L_6$ consists of a negative power single meniscus lens having a concave subject side surface. The dewar window element $L_W$ consist a flat optical member having parallel surfaces.

EXAMPLE II

Figure 6:
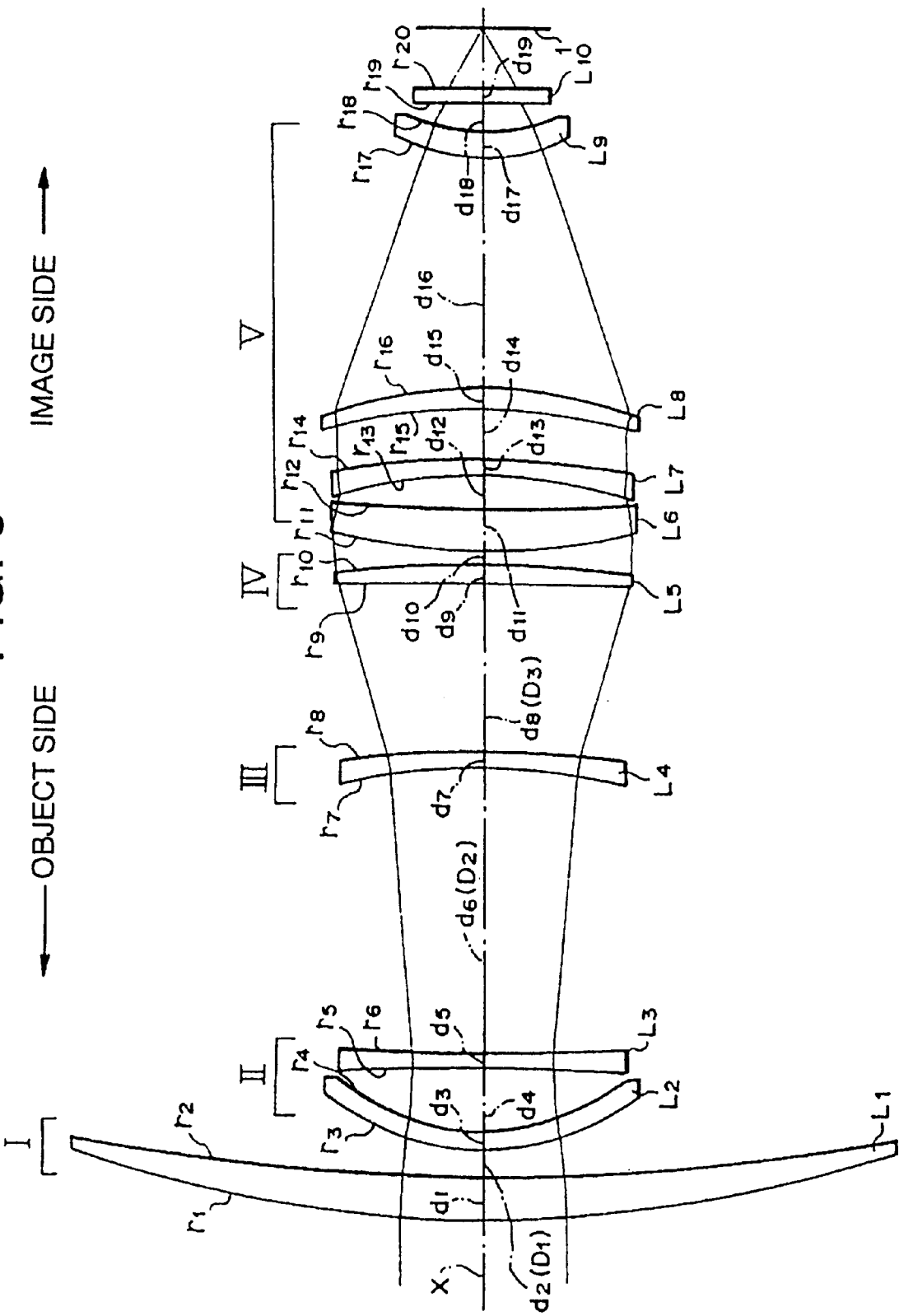
FIG. 6 is a diagrammatic side view of a basic optical structure of an infrared zoom lens, which is in a wide angle end position, in accordance with a second embodiment of the invention.
Figure 7A:
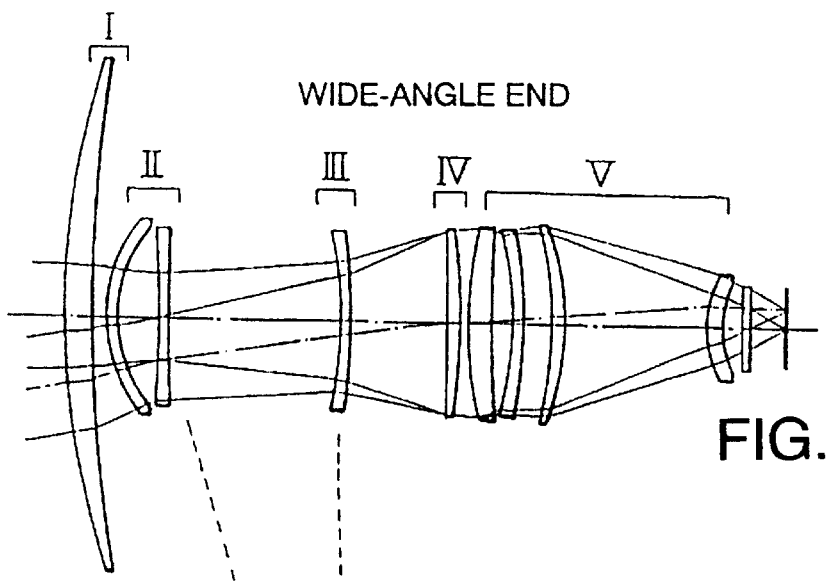
FIGS. 7A–7C are diagrammatic side views of the infrared zoom lens shown in FIG. 6 showing relative positions of component lenses in a wide angle end position, an intermediate position, and a tele-photo end position, respectively.
Figure 7B:
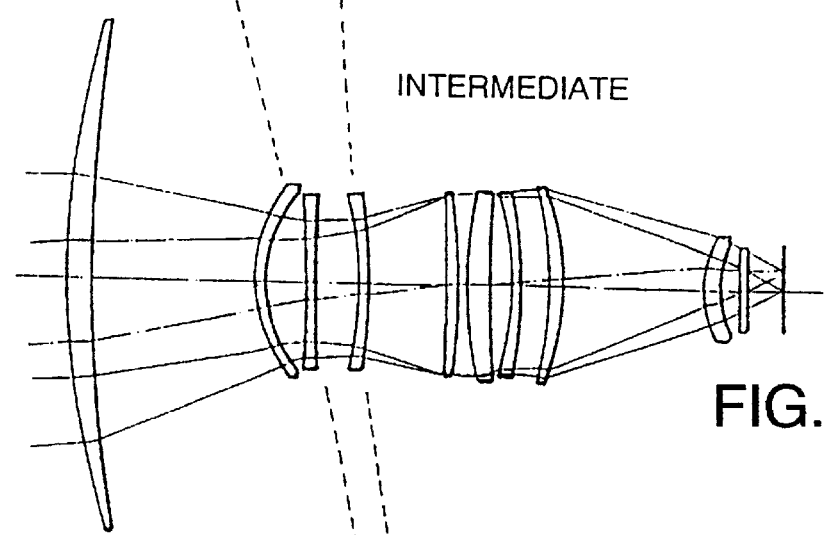
Figure 7C:
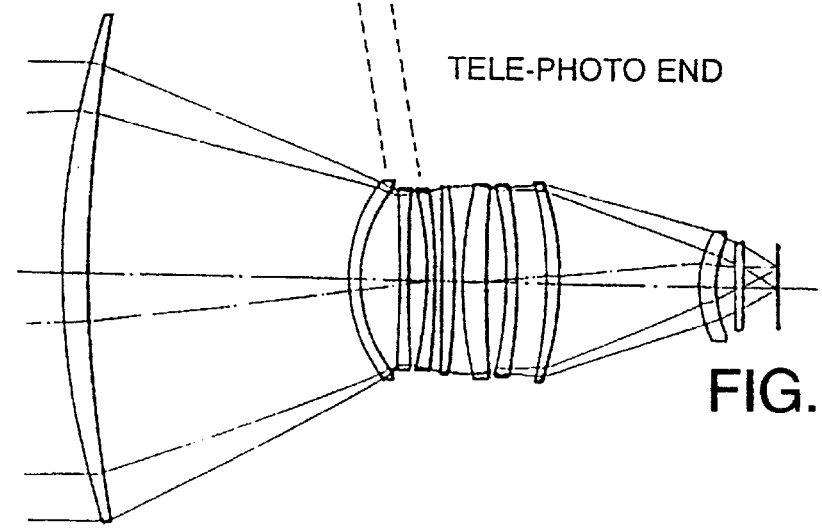

FIG. 6 shows an infrared zoom lens in accordance with another embodiment of the invention which is in a wide-angle end position or at a shortest zoom setting, and FIGS. 7A, 7B and 7C show the positional relationship of the infrared zoom lens of FIG. 6 at a wide-angle end position or at a shortest zoom setting, at an intermediate zoom setting, and a tele-photo end position or the longest zoom setting, respectively.

As shown in FIG. 6, the infrared zoom lens comprises five lens groups, arranged in order from the subject end to the image end, a positive power first lens group I, a negative power second lens group II, a third lens group III, a fourth lens group IV, a positive power fifth lens group V. Further, the infrared zoom lens is provided with a dewar window element $L_W$ of a dewar assembly placed between the fifth lens group V and an image plane 1. The second and third lens groups II and III are axially movable along an optical axis X in predetermined relation relative to each other and relative to the first, fourth and fifth lens groups II, IV and V which are stationary. During zooming the second lens group II works for varying the focal length, or the zoom ratio, of the infrared zoom lens, the third lens group III works for forming a sharp image on the image plane 1.

Specifically, each of the first, third and fourth lens groups I, III and IV comprises a single lens element $L_1$, $L_4$, $L_5$, the second lens group II comprises two lens elements $L_2$ and $L_3$, and the fifth lens group V comprises four lens elements $L_6$–$L_9$. Each of the first, sixth and ninth lens elements $L_1$, $L_6$ and $L_9$ consists of a positive power single meniscus lens having a convex subject side surface; each of the fifth and eighth lens elements $L_5$ and $L_8$ consists of a positive power single meniscus lens having a convex image side surface; the second lens element $L_2$ consists of a negative power single meniscus lens having a concave image side surface; each of the fourth and seventh lens elements $L_4$ and $L_7$ consists of a negative power single meniscus lens having a concave subject side surface, and the third lens element $L_3$ consists of a single bi-concave lens having a strong curvature of subject side surface. The dewar window element $L_W$ consist of a flat optical member having parallel surfaces.

EXAMPLE III

Figure 11:
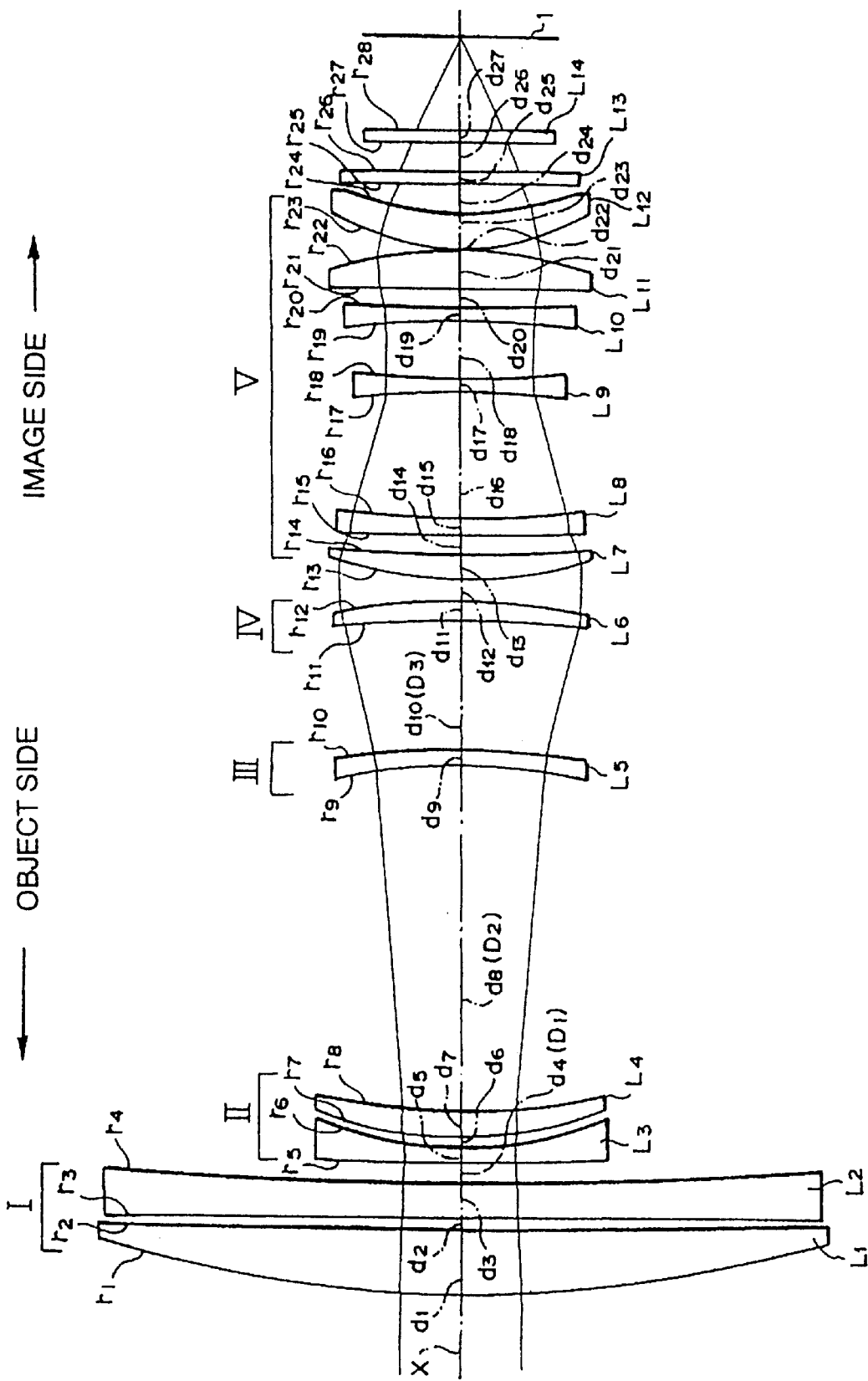
FIG. 11 is a diagrammatic side view of a basic optical structure of an infrared zoom lens, which is in a wide angle end position, in accordance with a third embodiment of the invention.

FIG. 11 shows an infrared zoom lens in accordance with another embodiment of the invention which is in a wide-angle end position or at a shortest zoom setting, and FIGS. 12A, 12B and 12C show the positional relationship of the infrared zoom lens of FIG. 11 at a wide-angle end position or at a shortest zoom setting, at an intermediate zoom setting, and a tele-photo end position or the longest zoom setting, respectively.

As shown in FIG. 11, the infrared zoom lens comprises five lens groups, arranged in order from the subject end to the image end, a positive power first lens group I, a negative power second lens group II, a third lens group III, a fourth lens group IV, a positive power fifth lens group V. Further, the infrared zoom lens is provided with a band-pass filter $L_F$ and a dewar window element $L_W$ of a dewar assembly arranged in order from the subject end to the image end between the fifth lens group V and an image plane 1. The second and third lens groups II and III are axially movable along an optical axis X in predetermined relation relative to each other and relative to the first, fourth and fifth lens groups II, IV and V which are stationary. During zooming the second lens group 1 works for varying the focal length, or the zoom ratio, of the infrared zoom lens, the third lens group III works for forming a sharp image on the image plane 1.

Specifically, the first and second lens groups I and II comprise two lens elements $L_1$ and $L_2$, and $L_3$ and $L_4$, respectively, each of the third and fourth lens groups III and IV comprises a single lens element $L_5$, $L_6$, and the fifth lens group V comprises six lens elements $L_6$–$L_{12}$. Each of the first, fourth, seventh and twelfth lens elements $L_1$, $L_4$, $L_7$ and $L_{12}$ consists of a positive power single meniscus lens having a convex subject side surface; each of the sixth and eleventh lens elements $L_6$ and $L_{11}$ consists of a positive power single meniscus lens having a convex image side surface; each of the third and eighth lens elements $L_3$ and $L_8$ consists of a negative power single meniscus lens having a concave image side surface; the fifth lens element $L_5$ consists of a negative power single meniscus lens having a concave subject side surface; the second lens element $L_2$ consists of a single piano-concave lens having a concave image side surface; and the tenth lens element $L_{10}$ consists of a single bi-concave lens having a strong curvature of subject side surface. Each of the band-pass filter $L_F$ and the dewar window element $L_W$ consist of a flat optical element having parallel flat surfaces.

EXAMPLE IV

Figure 16:
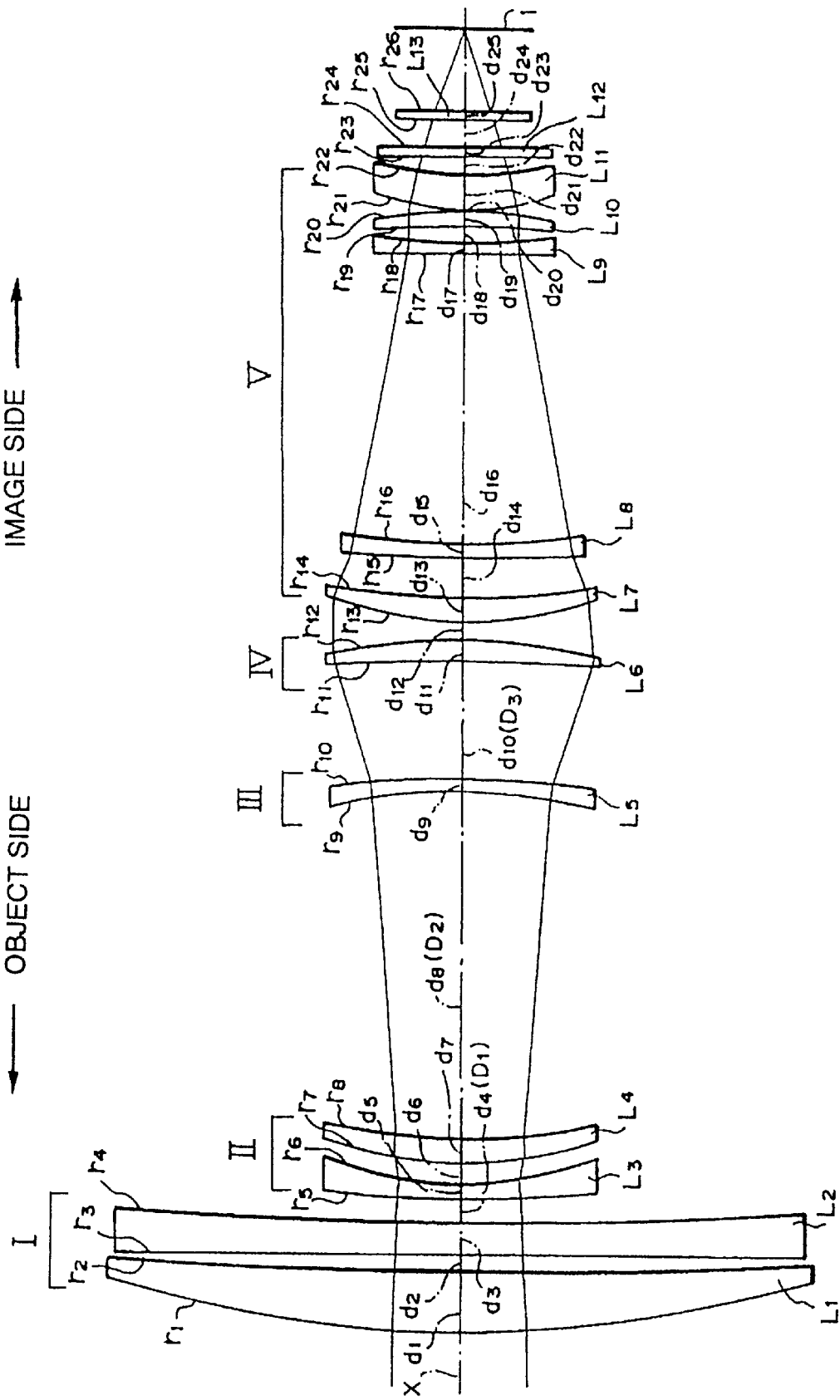
FIG. 16 is a diagrammatic side view of a basic optical structure of an infrared zoom lens, which is in a wide angle end position, in accordance with a fourth embodiment of the invention.

FIG. 16 shows an infrared zoom lens in accordance with still another embodiment of the invention which is in a wide-angle end position or at a shortest zoom setting, and FIGS. 17A, 17B and 17C show the positional relationship of the infrared zoom lens of FIG. 11 at a wide-angle end position or at a shortest zoom setting, at an intermediate zoom setting, and a telephoto end position or the longest zoom setting, respectively.

As shown in FIG. 16, the infrared zoom lens comprises five lens groups, arranged in order from the subject end to the image end, a positive power first lens group I, a negative power second lens group II, a third lens group III, a fourth lens group IV, a positive power fifth lens group V. Further, the infrared zoom lens is provided with a band-pass filter $L_F$ and a dewar window element $L_W$ of a dewar assembly arranged in order from the subject end to the image end between the fifth lens group V and an image plane 1. The band pass filter $L_F$ cuts infrared rays of wavelengths shorter than a specific wavelength, for instance approximately 3.5 $\mu$m, for isolating the infrared zoom lens from adverse effects of solar radiations when used in the infrared zoom lens covering a wavelength range of 3 to 5 $\mu$m or cuts infrared rays of wavelengths longer than a specific wavelength, for instance approximately 12 $\mu$m, which affect an imaging property due to relatively high damping in atomospheric air when used in the infrared zoom lens covering a wavelength range of 8 to 12 $\mu$m. Different band pass filters may be selectively placed in position between the fifth lens group V and the dewar assembly. The second and third lens groups II and III are axially movable along an optical axis X in predetermined relation relative to each other and relative to the first, fourth and fifth lens groups II, IV and V which are stationary. During zooming the second lens group II works for varying the focal length, or the zoom ratio, of the infrared zoom lens, the third lens group III works for forming a sharp image on the image plane 1.

Specifically, the first and second lens groups I and II comprise two lens elements $L_1$ and $L_2$, and $L_3$ and $L_4$, respectively, and each of the third and fourth lens groups III and IV comprises a single lens element $L_5$, $L_6$, and the fifth lens group V comprises five lens elements $L_7$–$L_{11}$. Each of the first, fourth, seventh and eleventh lens elements $L_1$, $L_4$, $L_7$ and $L_{11}$ consists of a positive power single meniscus lens having a convex subject side surface; each of the sixth and tenth lens elements $L_6$ and $L_{10}$ consists of a positive power single meniscus lens having a convex image side surface; each of the third and eighth lens elements $L_3$ and $L_8$ consists of a negative power single meniscus lens having a concave image side surface; the fifth lens element $L_5$ consists of a negative power single meniscus lens having a concave subject side surface; the second lens element $L_2$ consists of a single piano-concave lens having a concave image side surface; and the ninth lens element $L_9$ consists of a single biconcave lens having a strong curvature of image side surface. Each of the band-pass filter $L_F$ and the dewar window element $L_W$ of a dewar assembly consist of a flat optical element having parallel surfaces.

EXAMPLE V

Figure 21:
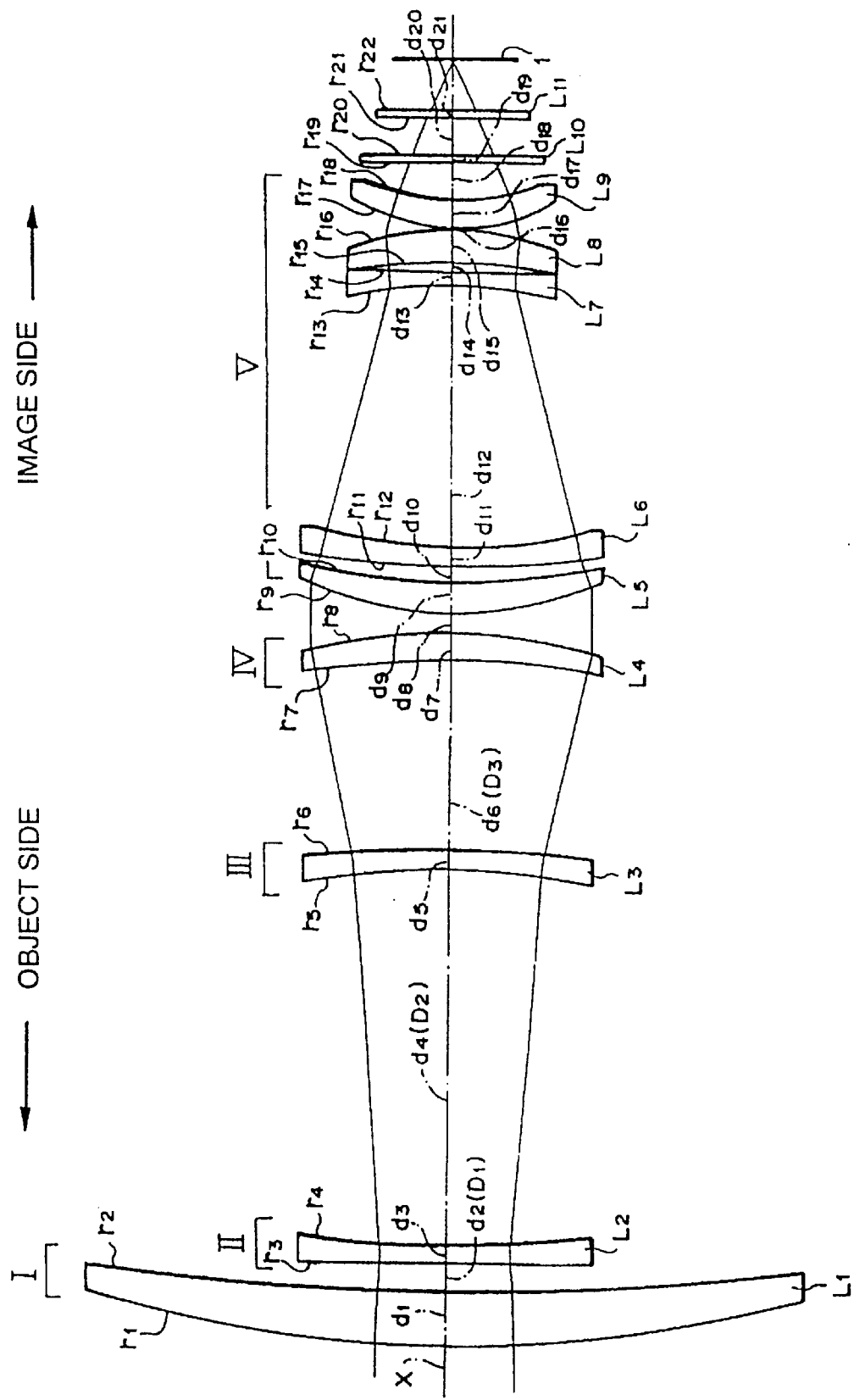
FIG. 21 is a diagrammatic side view of a basic optical structure of an infrared zoom lens, which is in a wide angle end position, in accordance with a fifth embodiment of the invention.
Figure 22A:
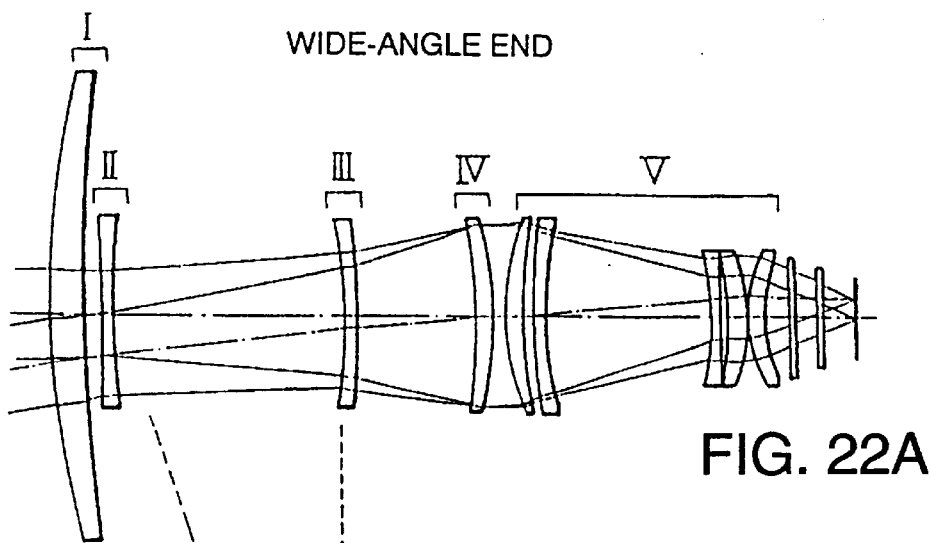
FIGS. 22A–22C are diagrammatic side views of the infrared zoom lens shown in FIG. 21 showing relative positions of component lenses in a wide angle end position, an intermediate position, and a telephoto end position, respectively.
Figure 22B:
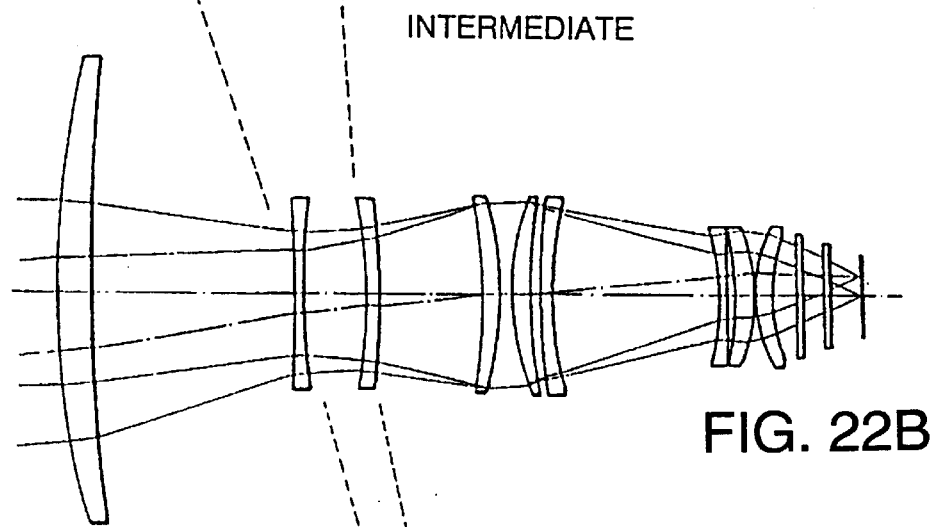
Figure 22C:
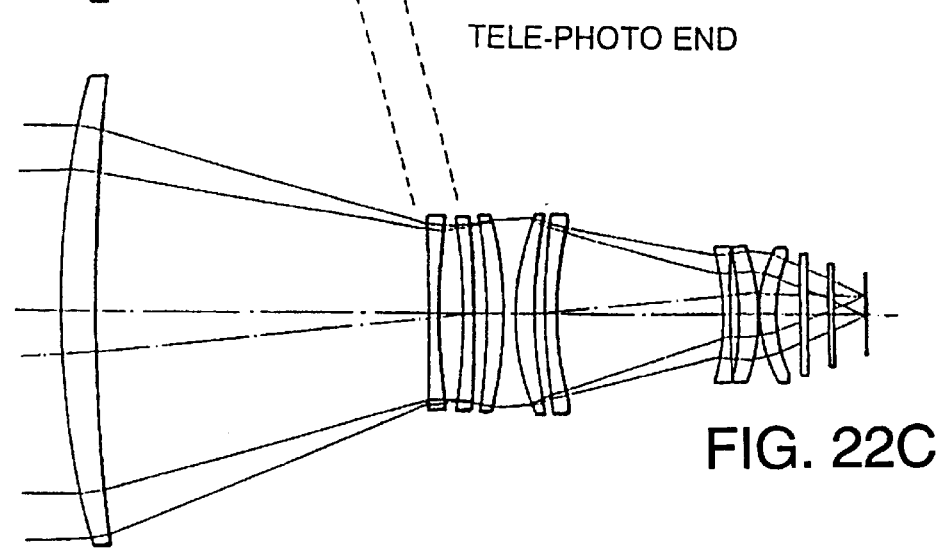

FIG. 21 shows an infrared zoom lens in accordance with a further embodiment of the invention which is in a wide-angle end position or at a shortest zoom setting, and FIGS. 22A, 22B and 22C show the positional relationship of the infrared zoom lens of FIG. 11 at a wide-angle end position or at a shortest zoom setting, at an intermediate zoom setting, and a tele-photo end position or the longest zoom setting, respectively.

As shown in FIG. 21, the infrared zoom lens comprises five lens groups, arranged in order from the subject end to the image end, a positive power first lens group I, a negative power second lens group II, a third lens group III, a fourth lens group IV, a positive power fifth lens group V. Further, the infrared zoom lens is provided with a band-pass filter $L_F$ and a dewar window element $L_W$ of a dewar assembly arranged in order from the subject end to the image end between the fifth lens group V and an image plane 1. The second and third lens groups II and III are axially movable along an optical axis X in predetermined relation relative to each other and relative to the first, fourth and fifth lens groups II, IV and V which are stationary. During zooming the second lens group II works for varying the focal length, or the zoom ratio, of the infrared zoom lens, the third lens group III works for forming a sharp image on the image plane 1.

Specifically, each of the first to fourth lens groups I–IV comprises a single lens element $L_1$, $L_2$, $L_3$, $L_4$, and the fifth lens group V comprises five lens elements $L_5$–$L_9$. Each of the first, fifth and ninth lens elements $L_1$, $L_5$, and $L_9$ consists of a positive power single meniscus lens having a convex subject side surface; each of the fourth and eighth lens elements $L_4$ and $L_8$ consists of a positive power single meniscus lens having a convex image side surface; each of the third and seventh lens elements $L_3$ and $L_7$ consists of a negative power single meniscus lens having a concave subject side surface; the sixth lens element $L_6$ consists of a negative power single meniscus lens having a concave image side surface; and the second lens element $L_2$ consists of a single bi-concave lens having a strong curvature of image side surface. Each of the band-pass filter $L_F$ and the dewar window element $L_W$ of a dewar assembly consist of a flat optical element having parallel flat surfaces.

In the following tables, various embodiments of the invention are set forth for various equivalent focal length ranges, with parameters of the invention. In the following prescription tables, the reference L followed by an Arabic numeral indicates the lens element progressively from the subject end to the image end of the infrared zoom lens. The reference radius numbers r are the progressive lens surface radii. Positive surface radii are struck from the right of the lens surface on the optical axis X. Negative surface radii are struck from the left of the lens surface on the optical axis X. The reference distance numbers d are the progressive axial distances between adjacent surfaces. The spaces D are spaces between lens groups which vary with changes in equivalent focal length (EFL).

An infrared zoom lens suitable for a wavelength range (λ) of 8 to 12 μm as shown in FIGS. 1 and 2A–2C scaled to an F number of 1.0 and EFL's of 25.0 mm to 100 mm is substantially described in Table I.

TABLE I

| Element | Radius of Curvature (mm) | Axial Distance Between Surfaces (mm) | Material |
|---|---|---|---|
| L1 | r1 = 216.0 | d1 = 10.62 | Germanium |
|  | r2 = 379.3 | d2 = D1 |  |
| L2 | r3 = 2834.0 | d3 = 4.50 | Germanium |
|  | r4 = 161.9 | d4 = D2 |  |
| L3 | r5 = −79.2 | d5 = 3.00 | Germanium |
|  | r6 = −116.2 | d6 = D3 |  |
| L4 | r7 = −621.6 | d7 = 3.50 | Germanium |
|  | r8 = −176.9 | d8 = 9.28 |  |
| L5 | r9 = 151.3 | d9 = 5.46 | Germanium |
|  | r10 = 719.8 | d10 = 5.83 |  |
| L6 | r11 = −103.6 | d11 = 3.00 | Germanium |
|  | r12 = −218.8 | d12 = 21.81 |  |
| L7 | r13 = −152.2 | d13 = 5.30 | Germanium |
|  | r14 = −102.2 | d14 = 23.73 |  |
| L8 | r15 = 49.2 | d15 = 5.96 | Germanium |
|  | r16 = 56.7 | d16 = 8.00 |  |
| LW | r17 = ∞ | d17 = 4.00 | Germanium |
|  | r18 = ∞ |  |  |

| Zoom Spacing | | | |
|---|---|---|---|
|  | D1 (mm) | D2 (mm) | D3 (mm) |
| WAE | 11.30 | 70.95 | 16.38 |
| INT | 52.50 | 29.32 | 16.81 |
| TPE | 81.86 | 11.93 | 4.84 |

Infared zoom lens depicted in FIG. 1 and described in prescription Table I has the parameters as follows:

| f1/ft | f2/ft | f5/ft |
|---|---|---|
| 1.59 | −0.57 | 0.51 |

As apparent, the infrared zoom lens depicted in FIG. 1 and described in prescription Table I satisfies the conditions (I)–(III).

Spherical aberrations for wavelengths of 8, 10 and 12 μm, astigmatism in sagittal and tangential planes, distortion, and lateral chromatic aberrations for wavelengths of 8, 10 and 12 μm of the infrared zoom lens shown in FIG. 1 in the wide-angle end (WAE) position, the intermediate (INT) position and the telephoto end (TPE) position are shown in FIGS. 3A–3C, 4A–4C and 5A–5C, respectively. As apparent from FIGS. 3A–3C, 4A–4C and 5A–5C, the infrared zoom lens has well balanced aberrations over the entire area of field-of-view and over the range of zoom ratio for infrared rays over a range of wavelengths between 8 and 12 μm.

An infrared zoom lens suitable for a wavelength range (λ) of 8 to 12 μm depicted in FIG. 6 scaled to an F number of 1.0 and EFL's of 50.0 mm to 200 mm is substantially described in Table II.

TABLE II

| Element | Radius of Curvature (mm) | Axial Distance Between Surfaces (mm) | Material |
|---|---|---|---|
| L1 | r1 = 388.0 | | |
| | | d1 = 12.66 | Germanium |
| | r2 = 707.1 | | |
| | | d2 = D1 | |
| L2 | r3 = 75.3 | | |
| | | d3 = 5.50 | Zinc Selenide |
| | r4 = 67.7 | | |
| | | d4 = 19.35 | |
| L3 | r5 = −742.4 | | |
| | | d5 = 4.50 | Germanium |
| | r6 = 1058.0 | | |
| | | d6 = D2 | |
| L4 | r7 = −180.1 | | |
| | | d7 = 4.50 | Germanium |
| | r8 = −348.2 | | |
| | | d8 = D3 | |
| L5 | r9 = −1163.0 | | |
| | | d9 = 6.00 | Germanium |
| | r10 = −380.8 | | |
| | | d10 = 4.42 | |
| L6 | r11 = 197.7 | | |
| | | d11 = 12.43 | Germanium |
| | r12 = 708.3 | | |
| | | d12 = 10.21 | |
| L7 | r13 = −146.8 | | |
| | | d13 = 4.50 | Germanium |
| | r14 = −275.5 | | |
| | | d14 = 15.22 | |
| L8 | r15 = −171.0 | | |
| | | d15 = 6.16 | Germanium |
| | r16 = −127.6 | | |
| | | d16 = 70.09 | |
| L9 | r17 = 51.8 | | |
| | | d17 = 8.03 | Germanium |
| | r18 = 54.6 | | |
| | | d18 = 9.00 | |
| LW | r19 = ∞ | | |
| | | d19 = 4.00 | Germanium |
| | r20 = ∞ | | |

Zoom Spacing

| | D1 (mm) | D2 (mm) | D3 (mm) |
|---|---|---|---|
| WAE | 8.30 | 84.85 | 48.91 |
| INT | 80.26 | 22.54 | 39.26 |
| TPE | 129.57 | 8.68 | 3.81 |

Infared zoom lens depicted in FIG. 6 and described in prescription Table II has the parameters as follows:

| f1/ft | f2/ft | f5/ft |
|---|---|---|
| 1.39 | −0.63 | 0.44 |

As apparent, the infrared zoom lens depicted in FIG. 6 and described in prescription Table II satisfies the conditions (I)–(III).

Spherical aberrations for wavelengths of 8, 10 and 12 $\mu$m, astigmatism in sagittal and tangential planes, distortion, and lateral chromatic aberrations for wavelengths of 8, 10 and 12 $\mu$m of the infrared zoom lens shown in FIG. 6 in the wide-angle end (WAE) position, the intermediate (INT) position and the tele-photo end (TPE) position are shown in FIGS. 8A–8C, 9A–9C and 10A–10C, respectively. As apparent from FIGS. 8A–8C, 9A–9C and 10A–10C, the infrared zoom lens has well balanced aberrations over the entire area of field-of-view and over the range of zoom ratio for infrared rays over a range of wavelengths between 8 and 12 $\mu$m.

An infrared zoom lens suitable for a wavelength range ($\lambda$) of 3 to 5 $\mu$m depicted in FIG. 11 scaled to an F number of 1.2 and EFL's of 25.0 mm to 100 mm is substantially described in Table III.

TABLE III

| Element | Radius of Curvature (mm) | Axial Distance Between Surfaces (mm) | Material |
|---|---|---|---|
| L1 | r1 = 221.2 | | |
| | | d1 = 10.83 | Silicon |
| | r2 = 2383.0 | | |
| | | d2 = 1.98 | |
| L2 | r3 = ∞ | | |
| | | d3 = 5.67 | Germanium |
| | r4 = 801.3 | | |
| | | d4 = D1 | |
| L3 | r5 = 541.1 | | |
| | | d5 = 2.50 | Silicon |
| | r6 = 68.2 | | |
| | | d6 = 1.95 | |
| L4 | r7 = 73.1 | | |
| | | d7 = 4.00 | Germanium |
| | r8 = 109.4 | | |
| | | d8 = D2 | |
| L5 | r9 = −97.2 | | |
| | | d9 = 2.33 | Germanium |
| | r10 = −150.8 | | |
| | | d10 = D3 | |
| L6 | r11 = −176.7 | | |
| | | d11 = 3.33 | Silicon |
| | r12 = −102.5 | | |
| | | d12 = 3.74 | |
| L7 | r13 = 68.7 | | |
| | | d13 = 4.17 | Silicon |
| | r14 = 214.7 | | |
| | | d14 = 3.73 | |
| L8 | r15 = 980.2 | | |
| | | d15 = 2.92 | Germanium |
| | r16 = 202.8 | | |
| | | d16 = 21.44 | |
| L9 | r17 = −216.4 | | |
| | | d17 = 2.50 | Silicon |
| | r18 = 205.7 | | |
| | | d18 = 9.43 | |
| L10 | r19 = −173.5 | | |
| | | d19 = 2.25 | Germanium |
| | r20 = 1514.0 | | |
| | | d20 = 3.49 | |
| L11 | r21 = −755.7 | | |
| | | d21 = 6.50 | Silicon |
| | r22 = −70.8 | | |
| | | d22 = 0.42 | |
| L12 | r23 = 44.4 | | |
| | | d23 = 5.83 | Silicon |
| | r24 = 58.3 | | |
| | | d24 = 5.00 | |
| LF | r25 = ∞ | | |
| | | d25 = 2.00 | Silicon |
| | r26 = ∞ | | |
| | | d26 = 5.00 | |
| LW | r27 = ∞ | | |
| | | d27 = 1.67 | Germanium |
| | r28 = ∞ | | |

Zoom Spacing

| | D1 (mm) | D2 (mm) | D3 (mm) |
|---|---|---|---|
| WAE | 3.75 | 58.23 | 22.26 |
| INT | 44.79 | 19.12 | 20.33 |
| TPE | 73.42 | 8.33 | 2.49 |

Infared zoom lens depicted in FIG. 11 and described in prescription Table III has the parameters as follows:

| f1/ft | f2/ft | f5/ft |
|---|---|---|
| 1.55 | −0.62 | 0.51 |

As apparent, the infrared zoom lens depicted in FIG. 11 and described in prescription Table III satisfies the conditions (I)–(III).

Spherical aberrations for wavelengths of 3, 4 and 5 $\mu$m, astigmatism in sagittal and tangential planes, distortion, and lateral chromatic aberrations for wavelengths of 3, 4 and 5 $\mu$m of the infrared zoom lens shown in FIG. 11 in the wide-angle end (WAE) position, the intermediate (INT) position and the tele-photo end (TPE) position are shown in FIGS. 13A–13C, 14A–14C and 15A–15C, respectively. As apparent from FIGS. 13A–13C, 14A–14C and 15A–15C, the infrared zoom lens has well balanced aberrations over the entire area of field-of-view and over the range of zoom ratio for infrared rays over a range of wavelengths between 3 and 5 $\mu$m.

An infrared zoom lens suitable for a wavelength range ($\lambda$) of 3 to 5 $\mu$m depicted in FIG. 16 scaled to an F number of 1.4 and EFL's of 50.0 mm to 200 mm is substantially described in Table IV.

TABLE IV

| Element | Radius of Curvature (mm) | Axial Distance Between Surfaces (mm) | Material |
|---|---|---|---|
| L1 | r1 = 333.3 | d1 = 15.00 | Silicon |
|  | r2 = 2002.0 | d2 = 3.75 |  |
| L2 | r3 = ∞ | d3 = 8.30 | Germanium |
|  | r4 = 1669.0 | d4 = D1 |  |
| L3 | r5 = 367.7 | d5 = 3.50 | Silicon |
|  | r6 = 96.3 | d6 = 5.54 |  |
| L4 | r7 = 107.7 | d7 = 5.80 | Germanium |
|  | r8 = 149.9 | d8 = D2 |  |
| L5 | r9 = −137.4 | d9 = 3.50 | Germanium |
|  | r10 = −269.0 | d10 = D3 |  |
| L6 | r11 = −444.8 | d11 = 5.50 | Silicon |
|  | r12 = −152.3 | d12 = 4.50 |  |
| L7 | r13 = 108.8 | d13 = 5.80 | Silicon |
|  | r14 = 200.6 | d14 = 10.64 |  |
| L8 | r15 = 605.2 | d15 = 3.50 | Germanium |
|  | r16 = 230.6 | d16 = 76.01 |  |
| L9 | r17 = −3301.0 | d17 = 3.00 | Silicon |
|  | r18 = 202.1 | d18 = 4.47 |  |
| L10 | r19 = −235.2 | d19 = 4.00 | Silicon |
|  | r20 = −113.0 | d20 = 0.50 |  |
|  | r21 = 64.5 |  |  |
| L11 | r22 = 88.5 | d21 = 9.40 | Silicon |
|  |  | d22 = 8.00 |  |
| LF | r23 = ∞ | d25 = 2.40 | Silicon |
|  | r24 = ∞ | d26 = 5.00 |  |
| LW | r25 = ∞ | d27 = 2.00 | Germanium |
|  | r26 = ∞ |  |  |

| Zoom Spacing | | | |
|---|---|---|---|
|  | D1 (mm) | D2 (mm) | D3 (mm) |
| WAE | 5.89 | 89.86 | 29.96 |
| INT | 67.32 | 33.63 | 24.76 |
| TPE | 109.98 | 12.00 | 3.73 |

Infared zoom lens depicted in FIG. 16 and described in prescription Table IV has the parameters as follows:

| f1/ft | f2/ft | f5/ft |
|---|---|---|
| 1.13 | −0.53 | 0.46 |

As apparent, the infrared zoom lens depicted in FIG. 16 and described in prescription Table IV satisfies the conditions (I)–(III).

Spherical aberrations for wavelengths of 3, 4 and 5 $\mu$m, astigmatism in sagittal and tangential planes, distortion, and lateral chromatic aberrations for wavelengths of 3, 4 and 5 $\mu$m of the infrared zoom lens shown in FIG. 16 in the wide-angle end (WAE) position, the intermediate (INT) position and the tele-photo end (TPE) position are shown in FIGS. 18A–18C, 19A–19C and 20A–20C, respectively. As apparent from FIGS. 18A–18C, 19A–19C and 20A–20C, the infrared zoom lens has well balanced aberrations over the entire area of field-of-view and over the range of zoom ratio for infrared rays over a range of wavelengths between 3 and 5 $\mu$m.

An infrared zoom lens suitable for a wavelength range ($\lambda$) of 3 to 5 $\mu$m depicted in FIG. 21 scaled to an F number of 1.2 and EFL's of 50.0 mm to 200 mm is substantially described in Table V.

TABLE V

| Element | Radius of Curvature (mm) | Axial Distance Between Surfaces (mm) | Material |
|---|---|---|---|
| L1 | r1 = 402.5 | d1 = 15.56 | Silicon |
|  | r2 = 833.7 | d2 = D1 |  |
| L2 | r3 = −5556.0 | d3 = 5.00 | Silicon |
|  | r4 = 352.7 | d4 = D2 |  |
| L3 | r5 = −256.2 | d5 = 5.56 | Germanium |
|  | r6 = −467.0 | d6 = D3 |  |
| L4 | r7 = −245.8 | d7 = 7.78 | Silicon |
|  | r8 = −163.9 | d8 = 6.11 |  |
|  | r9 = 105.3 |  |  |

TABLE V-continued

| | | |
|---|---|---|
| L5 | d9 = 8.89 | Silicon |
| r10 = 211.6 | | |
| | d10 = 4.74 | |
| r11 = 298.9 | | |
| L6 | d11 = 5.56 | Germanium |
| r12 = 166.6 | | |
| | d12 = 77.10 | |
| r13 = −140.6 | | |
| L7 | d13 = 3.89 | Silicon |
| r14 = −11110.0 | | |
| | d14 = 3.11 | |
| r15 = −165.8 | | |
| L8 | d15 = 9.67 | Silicon |
| r16 = −87.5 | | |
| | d16 = 0.56 | |
| r17 = 57.0 | | |
| L9 | d17 = 8.33 | Silicon |
| r18 = 68.3 | | |
| | d18 = 8.00 | |
| r19 = ∞ | | |
| LF | d19 = 2.67 | Silicon |
| r20 = ∞ | | |
| | d20 = 5.00 | |
| r21 = ∞ | | |
| LW | d21 = 2.22 | Germanium |
| r22 = ∞ | | |

Zoom Spacing

| | D1 (mm) | D2 (mm) | D3 (mm) |
|---|---|---|---|
| WAE | 8.94 | 109.32 | 55.83 |
| INT | 96.11 | 29.12 | 48.86 |
| TPE | 156.98 | 11.60 | 5.51 |

Infared zoom lens depicted in FIG. 21 and described in prescription Table V has the parameters as follows:

| f1/ft | f2/ft | f5/ft |
|---|---|---|
| 1.56 | −0.68 | 0.51 |

As apparent, the infrared zoom lens depicted in FIG. 21 and described in prescription Table V satisfies the conditions (I)–(III).

Spherical aberrations for wavelengths of 3, 4 and 5 $\mu$m, astigmatism in sagittal and tangential planes, distortion, and lateral chromatic aberrations for wavelengths of 3, 4 and 5 $\mu$m of the infrared zoom lens shown in FIG. 21 in the wide-angle end (WAE) position, the intermediate (INT) position and the tele-photo end (TPE) position are shown in FIGS. 23A–23C, 24A–24C and 25A–25C, respectively. As apparent from FIGS. 23A–23C, 24A–24C and 25A–25C, the infrared zoom lens has well balanced aberrations over the entire area of field-of-view and over the range of zoom ratio for infrared rays over a range of wavelengths between 3 and 5 $\mu$m.

As apparent from the above description, the infrared zoom lens of the invention can operate at F-numbers lower as compared with the conventional infrared zoom lenses and provides excellent optical performance over the entire area of field-of-view and over the range of zoom ratios, so as thereby to be suitable for use with a two-dimensional infrared area sensor and the like.

It is to be understood that the present invention may be embodied with various changes, modifications and improvements, which may occur to those skilled in the art, without departing from the spirit and scope of the invention defined in the following claims.

What is claimed is:

1. An infrared zoom lens suitable for infrared rays over at least one of a wavelength range of 3 to 5 $\mu$m and a wavelength range of 8 to 12 $\mu$m comprising, in order from the subject end to the image end, a positive power first lens group consisting of no more than two lens elements, a negative power second lens group consisting of no more than two lens elements, a third lens group comprising a single meniscus lens element with a concave subject side surface, a fourth lens group comprising a single meniscus lens element with a convex image side surface, and a positive power fifth lens group comprising at least four lens elements, a nearest one of the at least four lens elements of the fifth lens group to the image end being a positive meniscus lens with a concave image side surface, said second and third lens groups being axially movable in predetermined relation relative to each other and relative to said first, fourth and fifth lens groups which are stationary to vary the zoom ratio of the infrared zoom lens and form a sharp image on the image plane.

2. The infrared zoom lens as defined in claim 1, wherein said infrared zoom lens satisfying the following conditions:

$$1.00 < f_1/f_t$$
$$-0.40 > f_2/f_t$$
$$0.35 < f_5/f_t < 0.70$$

where $f_t$ is the overall focal length of the infrared zoom lens in the tele-photo end position, and $f_1$, $f_2$ and $f_5$ are the focal lengths of the first, second and fifth lens groups, respectively.

3. The infrared zoom lens as defined in claim 2, wherein said first, second, third and fourth lens groups comprise first, second, third and fourth single lens elements $L_1$, $L_2$, $L_3$ and $L_4$, respectively, and said fifth lens group comprises four lens elements $L_5$–$L_8$, each of said first, fifth and eighth lens elements $L_1$, $L_5$ and $L_8$ consisting of a positive power single meniscus lens having a convex subject side surface, each of said fourth and seventh lens elements $L_4$ and $L_7$ consisting of a positive power single lens, said second lens element $L_2$ consisting of a negative power single meniscus lens having a concave image side surface, and each of said third and sixth lens elements $L_3$ and $L_6$ consisting of a negative power single meniscus lens having a concave subject side surface.

4. The infrared zoom lens as defined in claim 3 scaled to an F number of 1.0 and EFL's of 25.0 mm to 100 mm substantially as described:

| Element | Radius of Curvature (mm) | Axial Distance Between Surfaces (mm) | Material |
|---|---|---|---|
| L1 | r1 = 216.0 | d1 = 10.62 | Germanium |
| | r2 = 379.3 | | |
| | | d2 = D1 | |
| L2 | r3 = 2834.0 | d3 = 4.50 | Germanium |
| | r4 = 161.9 | | |
| | | d4 = D2 | |
| L3 | r5 = −79.2 | d5 = 3.00 | Germanium |
| | r6 = −116.2 | | |
| | | d6 = D3 | |
| L4 | r7 = −621.6 | d7 = 3.50 | Germanium |
| | r8 = −176.9 | | |

-continued

|     | | | |
|-----|---|---|---|
|     |              | d8 = 9.28 |           |
|     | r9 = 151.3   |           |           |
| L5  |              | d9 = 5.46 | Germanium |
|     | r10 = 719.8  |           |           |
|     |              | d10 = 5.83 |          |
|     | r11 = −103.6 |           |           |
| L6  |              | d11 = 3.00 | Germanium |
|     | r12 = −218.8 |           |           |
|     |              | d12 = 21.81 |         |
|     | r13 = −152.2 |           |           |
| L7  |              | d13 = 5.30 | Germanium |
|     | r14 = −102.2 |           |           |
|     |              | d14 = 23.73 |         |
|     | r15 = 49.2   |           |           |
| L8  |              | d15 = 5.96 | Germanium |
|     | r16 = 56.7   |           |           |

Zoom Spacing

|     | D1 (mm) | D2 (mm) | D3 (mm) |
|-----|---------|---------|---------|
| WAE | 11.30   | 70.95   | 16.38   |
| INT | 52.50   | 29.32   | 16.81   |
| TPE | 81.86   | 11.93   | 4.84    | where reference radius numbers r are the progressive lens surface radii, reference distance numbers d are the progressive axial distances between adjacent surfaces, and spaces D are spaces between lens groups in a wide-angle end (WAE) position, an intermediate (INT) position and a tele-photo end (TPE) position, respectively.

5. The infrared zoom lens as defined in claim 2, wherein said first, third and fourth lens groups comprise single lens element $L_1$, $L_4$ and $L_5$, respectively, said second lens group comprises two lens elements $L_2$ and $L_3$, and said fifth lens group V comprises four lens elements $L_6$–$L_9$, each of said first, sixth and ninth lens elements $L_1$, $L_6$ and $L_9$ consisting of a positive power single meniscus lens having a convex subject side surface, each of said fifth and eighth lens elements $L_5$ and $L_8$ consisting of a positive power single lens, said second lens element $L_2$ consisting of a negative power single meniscus lens having a concave image side surface, each of said fourth and seventh lens elements $L_4$ and $L_7$ consisting of a negative power single meniscus lens having a concave subject side surface, and said third lens element $L_3$ consisting of a negative power single lens.

6. The infrared zoom lens as defined in claim 5 scaled to an F number of 1.0 and EFL's of 50.0 mm to 200 mm substantially as described:

| Element | Radius of Curvature (mm) | Axial Distance Between Surfaces (mm) | Material |
|---------|--------------------------|--------------------------------------|----------|
|         | r1 = 388.0               |                                      |          |
| L1      |                          | d1 = 12.66                           | Germanium |
|         | r2 = 707.1               |                                      |          |
|         |                          | d2 = D1                              |          |
|         | r3 = 75.3                |                                      |          |
| L2      |                          | d3 = 5.50                            | Zinc Selenide |
|         | r4 = 67.7                |                                      |          |
|         |                          | d4 = 19.35                           |          |
|         | r5 = −742.4              |                                      |          |
| L3      |                          | d5 = 4.50                            | Germanium |
|         | r6 = 1058.0              |                                      |          |
|         |                          | d6 = D2                              |          |
|         | r7 = −180.1              |                                      |          |

-continued

|     |              |           |           |
|-----|--------------|-----------|-----------|
| L4  |              | d7 = 4.50 | Germanium |
|     | r8 = −348.2  |           |           |
|     |              | d8 = D3   |           |
|     | r9 = −1163.0 |           |           |
| L5  |              | d9 = 6.00 | Germanium |
|     | r10 = −380.8 |           |           |
|     |              | d10 = 4.42 |          |
|     | r11 = 197.7  |           |           |
| L6  |              | d11 = 12.43 | Germanium |
|     | r12 = 708.3  |           |           |
|     |              | d12 = 10.21 |         |
|     | r13 = −146.8 |           |           |
| L7  |              | d13 = 4.50 | Germanium |
|     | r14 = −275.5 |           |           |
|     |              | d14 = 15.22 |         |
|     | r15 = −171.0 |           |           |
| L8  |              | d15 = 6.16 | Germanium |
|     | r16 = −127.6 |           |           |
|     |              | d16 = 70.09 |         |
|     | r17 = 51.8   |           |           |
| L9  |              | d17 = 8.03 | Germanium |
|     | r18 = 54.6   |           |           |

Zoom Spacing

|     | D1 (mm) | D2 (mm) | D3 (mm) |
|-----|---------|---------|---------|
| WAE | 8.30    | 84.85   | 48.91   |
| INT | 80.26   | 22.54   | 39.26   |
| TPE | 129.57  | 8.68    | 3.81    | where reference radius numbers r are the progressive lens surface radii, reference distance numbers d are the progressive axial distances between adjacent surfaces, and spaces D are spaces between lens groups in a wide-angle end (WAE) position, an intermediate (INT) position and a tele-photo end (TPE) position, respectively.

7. The infrared zoom lens as defined in claim 2, wherein said first and second lens groups comprise two lens elements $L_1$, $L_2$, $L_3$ and $L_4$, respectively, said third and fourth lens groups comprise single lens elements $L_5$ and $L_6$, respectively, and said fifth lens group comprises six lens elements $L_6$–$L_{12}$, said first lens element $L_1$ consisting of a positive power single lens, each of said fourth, seventh and twelfth lens elements $L_4$, $L_7$ and $L_{12}$ consisting of a positive power single meniscus lens having a convex subject side surface, each of said sixth and eleventh lens elements $L_6$ and $L_{11}$ consisting of a positive power single lens having a convex image side surface, said fifth lens element $L_5$ consisting of a negative power single meniscus lens having a concave subject side surface, and each of said second, third, eighth, ninth and tenth lens element $L_2$, $L_3$, $L_8$, $L_9$ and $L_{10}$ consisting of a negative power single lens.

8. The infrared zoom lens as defined in claim 7 scaled to an F number of 1.2 and EFL's of 25.0 mm to 100 mm substantially as described:

| Element | Radius of Curvature (mm) | Axial Distance Between Surfaces (mm) | Material |
|---------|--------------------------|--------------------------------------|----------|
|         | r1 = 221.2               |                                      |          |
| L1      |                          | d1 = 10.83                           | Silicon  |
|         | r2 = 2383.0              |                                      |          |
|         |                          | d2 = 1.98                            |          |
|         | r3 = ∞                   |                                      |          |
| L2      |                          | d3 = 5.67                            | Germanium |
|         | r4 = 801.3               |                                      |          |
|         |                          | d4 = D1                              |          |
|         | r5 = 541.1               |                                      |          |

-continued

| | | | |
|---|---|---|---|
| L3 | r6 = 68.2 | d5 = 2.50 | Silicon |
| | r7 = 73.1 | d6 = 1.96 | |
| L4 | r8 = 109.4 | d7 = 4.00 | Germanium |
| | r9 = −97.2 | d8 = D2 | |
| L5 | r10 = −150.8 | d9 = 2.33 | Germanium |
| | r11 = −176.7 | d10 = D3 | |
| L6 | r12 = −102.5 | d11 = 3.33 | Silicon |
| | r13 = 68.7 | d12 = 3.74 | |
| L7 | r14 = 214.7 | d13 = 4.17 | Silicon |
| | r15 = 980.2 | d14 = 3.73 | |
| L8 | r16 = 202.8 | d15 = 2.92 | Germanium |
| | r17 = −216.4 | d16 = 21.44 | |
| L9 | r18 = 205.7 | d17 = 2.50 | Silicon |
| | r19 = −173.5 | d18 = 9.43 | |
| L10 | r20 = 1514.0 | d19 = 2.25 | Germanium |
| | r21 = −755.7 | d20 = 3.49 | |
| L11 | r22 = −70.8 | d21 = 6.50 | Silicon |
| | r23 = 44.4 | d22 = 0.42 | |
| L12 | r24 = 58.3 | d23 = 5.83 | Silicon |

Zoom Spacing

| | D1 (mm) | D2 (mm) | D3 (mm) |
|---|---|---|---|
| WAE | 3.75 | 58.23 | 22.26 |
| INT | 44.79 | 19.12 | 20.33 |
| TPE | 73.42 | 8.33 | 2.49 | where reference radius numbers r are the progressive lens surface radii, reference distance numbers d are the progressive axial distances between adjacent surfaces, and spaces D are spaces between lens groups in a wide-angle end (WAE) position, an intermediate (INT) position and a tele-photo end (TPE) position, respectively.

9. The infrared zoom lens as defined in claim 2, wherein said first and second lens groups comprise two lens elements $L_1$ and $L_2$, and $L_3$ and $L_4$, respectively, said third and fourth lens groups comprise single lens elements $L_5$ and $L_6$, respectively, and said fifth lens group comprises five lens elements $L_7$–$L_{11}$, said first lens element consisting of a positive power single lens, each of said fourth, seventh and eleventh lens elements $L_4$, $L_7$ and $L_{11}$ consisting of a positive power single meniscus lens having a convex subject side surface, each of said sixth and tenth lens elements $L_6$ and $L_{10}$ consisting of a positive power single lens having a convex image side surface, said fifth lens element $L_5$ consisting of negative power single meniscus lens having a concave subject side surface, and each of said second, third, eighth and ninth lens elements $L_2$, $L_3$, $L_8$ and $L_9$ consisting of a negative power single lens.

10. The infrared zoom lens as defined in claim 9 scaled to an F number of 1.4 and EFL's of 50.0 mm to 200 mm substantially as described:

| | Radius of Element Curvature (mm) | Axial Distance Between Surfaces (mm) | Material |
|---|---|---|---|
| L1 | r1 = 333.3 | d1 = 15.00 | Silicon |
| | r2 = 2002.0 | d2 = 3.75 | |
| L2 | r3 = ∞ | d3 = 8.30 | Germanium |
| | r4 = 1669.0 | d4 = D1 | |
| L3 | r5 = 367.7 | d5 = 3.50 | Silicon |
| | r6 = 96.3 | d6 = 5.54 | |
| L4 | r7 = 107.7 | d7 = 5.80 | Germanium |
| | r8 = 149.9 | d8 = D2 | |
| L5 | r9 = −137.4 | d9 = 3.50 | Germanium |
| | r10 = −269.0 | d10 = D3 | |
| L6 | r11 = −444.8 | d11 = 5.50 | Silicon |
| | r12 = −152.3 | d12 = 4.50 | |
| L7 | r13 = 108.8 | d13 = 5.80 | Silicon |
| | r14 = 200.6 | d14 = 10.64 | |
| L8 | r15 = 605.2 | d15 = 3.50 | Germanium |
| | r16 = 230.6 | d16 = 76.01 | |
| L9 | r17 = −3301.0 | d17 = 3.00 | Silicon |
| | r18 = 202.1 | d18 = 4.47 | |
| L10 | r19 = −235.2 | d19 = 4.00 | Silicon |
| | r20 = −113.0 | d20 = 0.50 | |
| L11 | r21 = 64.5 | d21 = 9.40 | Silicon |
| | r22 = 88.5 | | |

Zoom Spacing

| | D1 (mm) | D2 (mm) | D3 (mm) |
|---|---|---|---|
| WAE | 5.89 | 89.86 | 29.96 |
| INT | 67.32 | 33.63 | 24.76 |
| TPE | 109.98 | 12.00 | 3.73 | where reference radius numbers r are the progressive lens surface radii, reference distance numbers d are the progressive axial distances between adjacent surfaces, and spaces D are spaces between lens groups in a wide-angle end (WAE) position, an intermediate (INT) position and a tele-photo end (TPE) position, respectively.

11. The infrared zoom lens as defined in claim 2, wherein each of said first to fourth lens groups comprises a single lens element $L_1$, $L_2$, $L_3$, $L_4$, and said fifth lens group comprises five lens elements $L_5$–$L_9$, each of said first, fifth and ninth lens elements $L_1$, $L_5$ and $L_9$ consisting of a positive power single meniscus lens having a convex subject side surface, each of said fourth and eighth lens elements $L_4$ and $L_8$ consisting of a positive power single lens having a convex image side surface, said third lens element $L_3$ consisting of a negative power single meniscus lens having a concave subject side surface, said sixth lens element $L_6$ consisting of a negative power single meniscus lens having a concave image side surface, and each of said second and seventh lens elements $L_2$ and $L_7$ consisting of a negative power single lens.

12. The infrared zoom lens as defined in claim 11 scaled to an F number of 1.2 and EFL's of 50.0 mm to 200 mm substantially as described:

| Element | Radius of Curvature (mm) | Axial Distance Between Surfaces (mm) | Material |
|---|---|---|---|
| L1 | r1 = 402.5 | d1 = 15.56 | Silicon |
|  | r2 = 833.7 | d2 = D1 |  |
| L2 | r3 = −5556.0 | d3 = 5.00 | Silicon |
|  | r4 = 352.7 | d4 = D2 |  |
| L3 | r5 = −256.2 | d5 = 5.56 | Germanium |
|  | r6 = −467.0 | d6 = D3 |  |
| L4 | r7 = −245.8 | d7 = 7.78 | Silicon |
|  | r8 = −163.9 | d8 = 6.11 |  |
| L5 | r9 = 105.3 | d9 = 8.89 | Silicon |
|  | r10 = 211.6 | d10 = 4.74 |  |
| L6 | r11 = 298.9 | d11 = 5.56 | Germanium |
|  | r12 = 166.6 | d12 = 77.10 |  |
| L7 | r13 = −140.6 | d13 = 3.89 | Silicon |
|  | r14 = −11110.0 | d14 = 3.11 |  |
| L8 | r15 = −165.8 | d15 = 9.67 | Silicon |
|  | r16 = −87.5 | d16 = 0.56 |  |
| L9 | r17 = 57.0 | d17 = 8.33 | Silicon |
|  | r18 = 68.3 |  |  |

| | Zoom Spacing | | |
|---|---|---|---|
| | D1 (mm) | D2 (mm) | D3 (mm) |
| WAE | 8.94 | 109.32 | 55.83 |
| INT | 96.11 | 29.12 | 48.86 |
| TPE | 156.98 | 11.60 | 5.51 | where reference radius numbers r are the progressive lens surface radii, reference distance numbers d are the progressive axial distances between adjacent surfaces, and spaces D are spaces between lens groups in a wide-angle end (WAE) position, an intermediate (INT) position and a tele-photo end (TPE) position, respectively.

13. The infrared zoom lens of claim 4, wherein the zoom lens is suitable for a wavelength range of 8 to 12 $\mu$m.

14. The infrared zoom lens of claim 6, wherein the zoom lens is suitable for a wavelength range of 8 to 12 $\mu$m.

15. The infrared zoom lens of claim 8, wherein the zoom lens is suitable for a wavelength range of 8 to 12 $\mu$m.

16. The infrared zoom lens of claim 10, wherein the zoom lens is suitable for a wavelength range of 8 to 12 $\mu$m.

17. The infrared zoom lens of claim 12, wherein the zoom lens is suitable for a wavelength range of 8 to 12 $\mu$m.

18. The infrared zoom lens of claim 1, wherein the single meniscus lens element of the fourth lens group is structured and arranged so that light rays leaving the fourth lens element and entering the fifth lens element remain nearly parallel.

19. The infrared zoom lens of claim 1, wherein a nearest one of the at least four lens elements of the fifth lens group to the subject is a positive meniscus lens with a convex subject side surface.

* * * * *